United States Patent [19]

Markstein et al.

[11] 4,104,721
[45] Aug. 1, 1978

[54] HIERARCHICAL SECURITY MECHANISM FOR DYNAMICALLY ASSIGNING SECURITY LEVELS TO OBJECT PROGRAMS

[75] Inventors: Peter Willy Markstein; Alan Levi Tritter, both of Yorktown Heights, N.Y.

[73] Assignee: International Business Machines Corporation, Armonk, N.Y.

[21] Appl. No.: 755,899

[22] Filed: Dec. 30, 1976

[51] Int. Cl.$^2$ .............................................. G06F 9/18
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,916,385 | 10/1975 | Parmar et al. | 364/200 |
| 4,001,783 | 1/1977 | Monahan et al. | 364/200 |
| 4,017,839 | 4/1977 | Calle et al. | 364/200 |
| 4,020,471 | 4/1977 | Woods et al. | 364/200 |
| 4,038,645 | 7/1977 | Birney et al. | 364/200 |

*Primary Examiner*—Melvin B. Chapnick
*Attorney, Agent, or Firm*—Roy R. Schlemmer, Jr.

[57] ABSTRACT

A computer system organization which allows a program to specify a predetermined security level for other programs which it invokes, while at the same time being subject to security restraints placed on it either by a higher priority level invoking program or by the operating system. A plurality of security levels organized as a hierarchy which may be established by both problem programmers, and the operating system are then controlled by the operating system. A program cannot change its previously assigned level. Only a higher level invoking program can make such an alteration. A new program's security level indicator must be validated and then a protection code or 'mask' of a predetermined size related to the security level must be validated. The system utilizes a plurality of special purpose bits in every data word which bits contain the protection field. Level indicators for the particular program determine the use of the protection field. A series of linking registers or a 'Link Stack' having appropriate logic circuitry connected thereto is utilized for keeping track of the security level of all programs in a hierarchical sequence currently running on the system. The stack allows proper branching back to an originating program and prevents violation of security rules. The hardware additionally provides a mechanism for automatically checking each and every memory access, whether read or write, to assure that a correct protection field is present in each of the memory data words which is to be accessed or stored into.

23 Claims, 18 Drawing Figures

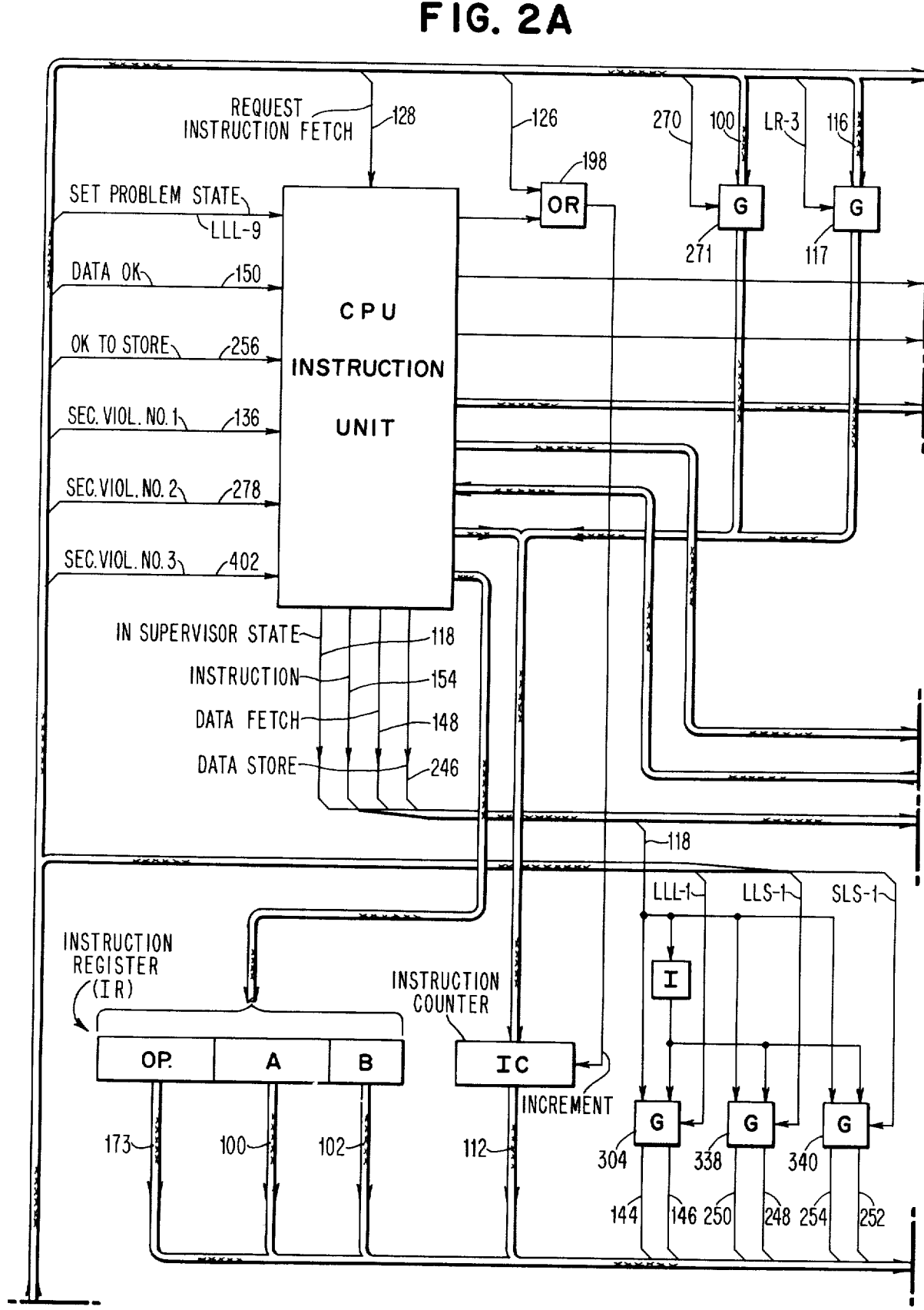

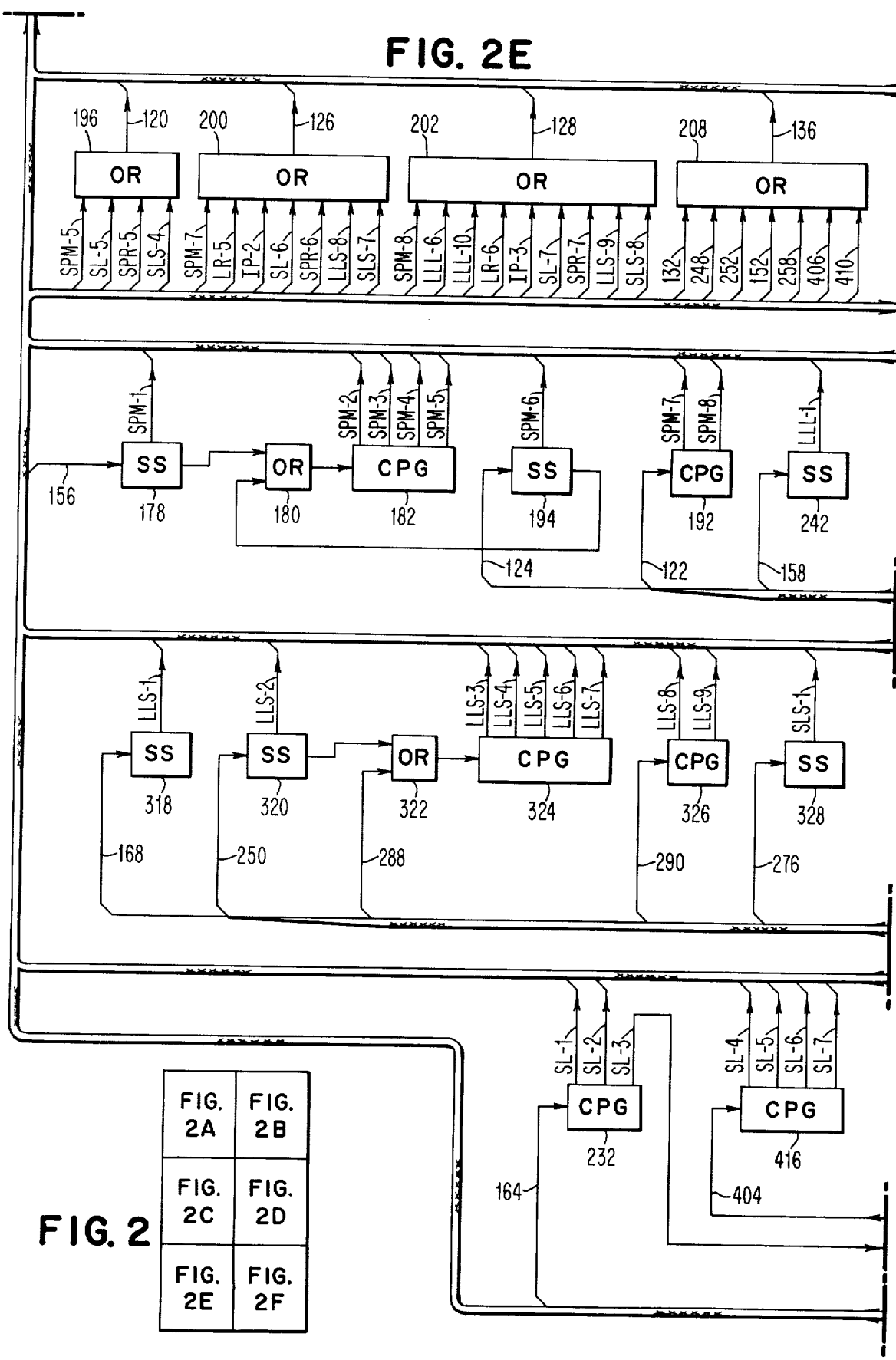

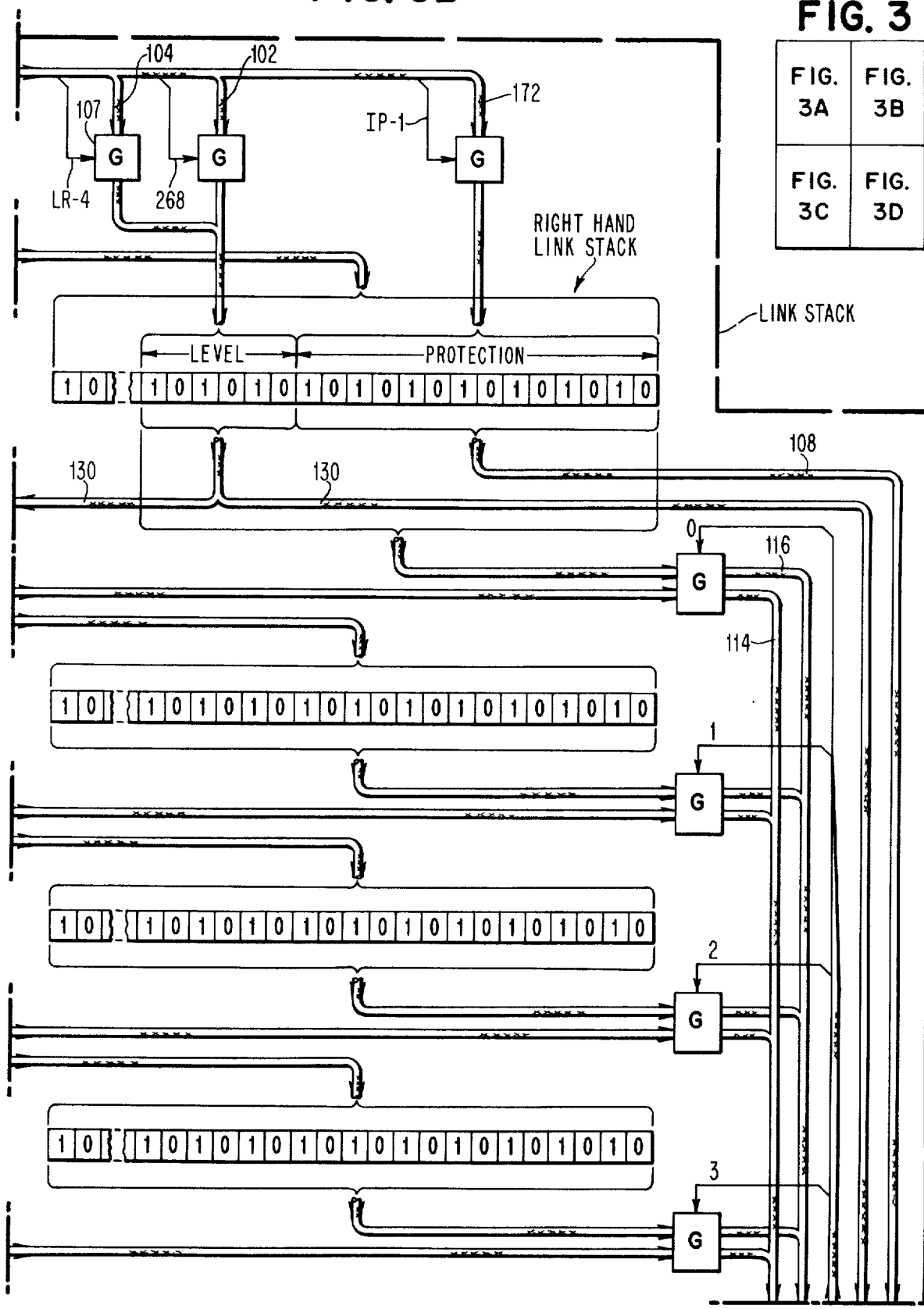

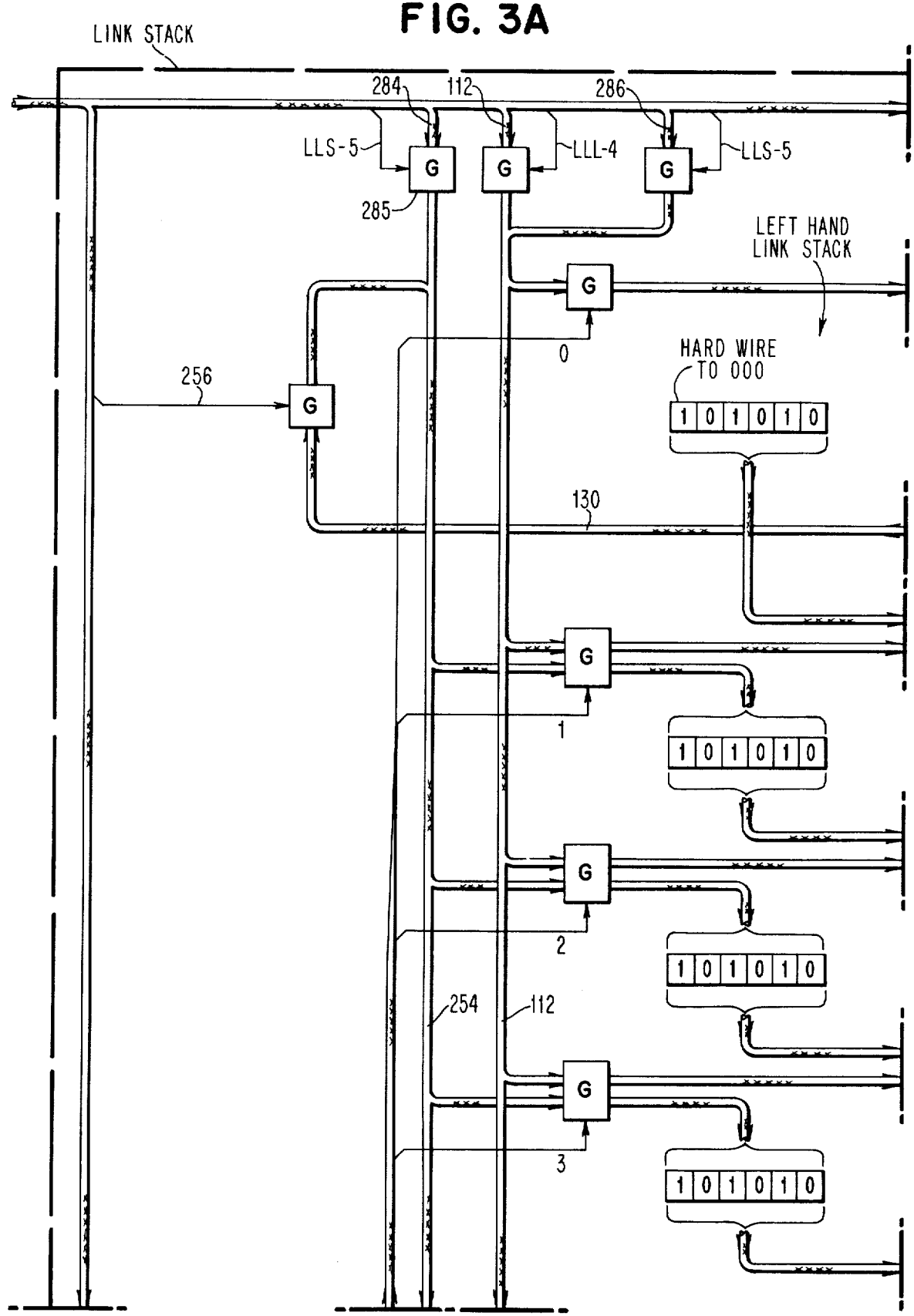

1. STORE PROTECTION IN MEMORY

| OPERATION CODE | ADDR. OF FIRST WORD IN MEMORY | NO. OF WORDS |
|---|---|---|

2. LINK TO LOWER LEVEL

| OPERATION CODE | BRANCH ADDRESS | LEVEL |
|---|---|---|

3. LINK RETURN

| OPERATION CODE | | |
|---|---|---|

4. INSERT PROTECTION

| OPERATION CODE | | PROTECTION BITS |
|---|---|---|

5. STORE LEVEL REGISTER

| OPERATION CODE | ADDRESS | |
|---|---|---|

6. STORE PROTECTION REGISTER

| OPERATION CODE | ADDRESS | |
|---|---|---|

7. LOAD INTO LINK STACK

| OPERATION CODE | ADDRESS | |
|---|---|---|

8. STORE FROM LINK STACK

| OPERATION CODE | ADDRESS | |
|---|---|---|

FIG. 6B

HIERARCHICAL SECURITY MECHANISM FOR DYNAMICALLY ASSIGNING SECURITY LEVELS TO OBJECT PROGRAMS

BACKGROUND OF THE INVENTION

There is an ever increasing need in the data handling industry for data privacy and/or security. This industry includes in a larger sense the communications industry, as well as the actual electronic data processing industry including, of course, large scale computers. In the communications field, data being transmitted via radio communication or telephone lines is susceptible of interception and unauthorized user alteration or appropriation for some unproper purpose. Various cryptographic systems have been offered to reduce, eliminate or somewhat control this vulnerability of data to an unauthorized user or penetrator.

In the field of electronic computers the unauthorized access of data is a far more complicated problem. The problem becomes even more complex in a large, modern, sophisticated time sharing computer system utilizing a plurality of remote access terminals any one of which has access to the central computer facilities including computational capabilities as well as all the memories containing data, programs, etc. In such systems data or programs may be obtained in an unauthorized fashion by accessing various storage devices within the system such as memories or intercepting messages being transmitted between terminals or between terminals and the host of a remote access computer network.

The problem becomes still more complicated when provisions are made for one program to call another program to perform tasks for it. Offsetting the advantages of having such a versatile structure are the disadvantages of sometimes inadvertently making data and/or programs of the calling program accessible to the called program and/or any operators who may be using such called program. This is an undesirable feature for many reasons. For example, the higher level or calling program may have data stored in its own memory locations which is considered of a highly confidential nature, which should have only extremely limited dissemination paths. Thus, if such confidential data of a higher level program were somehow made available to the lower-level program, such confidentiality would be seriously compromised. As a further example, someone wishing to commit some sort of fraud or simply to cause problems for an employer, for example, might obtain access to some highly confidential programs or data and deliberately cause them to malfunction or be destroyed with a resulting great financial loss. In any event, coupled with the desire to have the flexibility of allowing one program to call other programs resident within a system, is the considerable problem of maintaining the relative security of the program and especially the security of the higher-level or invoking program.

Current privacy laws also place an increasingly greater burden upon the computer manufacturer and user to guard the privacy of the data of individuals or businesses from unauthorized penetration and use. Such unauthorized access to the computer can have ramifications too numerous to mention, going from the mere access of the confidential business or personal data as outlined above by someone who has no real need to know this information, to the unauthorized access of bank or payroll records which in an exaggerated case could cause money to be improperly dispensed and/or incorrectly credited to the wrong person's account, resulting in great potential financial losses.

Among the many schemes proposed in the past for preventing unauthorized access to computer facilities is the security password interrupt. In a conventional multi-programmed, time-shared computer system as is commonly in use today, given users are assigned areas of memory to which they are allowed access, and they are further given special identifier keys or 'passwords' which are used to request that a range of memory addresses be made accessible to that particular user. In normal operations, if the user attempts incorrectly to access a portion of memory not assigned him the system will cause a 'security' interrupt. For this form of protection, the operating system architecture assumes that a program attempting incorrectly to access a portion of memory, would be operating in the "problem" or non-privileged state. When in the supervisory or privileged state the system, in normal usage, would be allowed access to any portion of the computer for any purpose, including modification of the operating system itself. Hardware systems have been suggested in the past for controlling the inadvertent or deliberate attempt to gain unauthorized access to such supervisory state. An example of such a hardware attempt to prevent unauthorized supervisory state penetration is co-pending application Ser. No. 701,058 filed June 30, 1976 of C. R. Attanasio entitled, "Location Dependence for Assuring the Security of System-Control Operations."

The present invention is not directed towards the specific problem of preventing inadvertent access to supervisory state as a means of improving computer security, but deals with the more generalized problems of providing the flexibility within a system to allow a given program to readily call other programs to perform tasks for the originating program, while at the same time maintaining the security or privacy of data of the originating program which it does not desire to expose to the called program. For such a mechanism to be feasible and practical in a system environment it must be relatively easy to use, such that the functions are easily accessible and the protection required must be automatic or inherent in the system. It is further necessary that such a system in order to be acceptable to the industry must maintain the basic concept of the protection field or masks.

SUMMARY AND OBJECTS OF THE INVENTION

It has now been found that a greatly improved program and data-integrity system may be realized in more or less conventional CPU architecture, by utilizing the concept of hierarchical security levels. A given program's security level determines how much of its assigned protection field must match the protection criteria established by the system for that program. Thus, the protection level for the program establishes a window having a level-determined width through which the protection field is examined for security check purposes.

It is accordingly a primary object of the present invention to provide a hierarchical security mechanism which allows an object programmer to estabish quite arbitrarily a security level for the primary program as well as any sub-applications or called programs.

It is also an object of the present invention to provide such a security mechanism or supervisory-state application, to switch it off as desired.

It is another object to provide such a security mechanism which utilizes the protection field 'password' concept in determining successful security checks.

It is still another object of the invention to provide such a security mechanism wherein the programmer may keep the originating program and any and all called programs completely secure with respect to each other.

It is a still further object to provide such a security mechanism wherein the calling program is always secure from any penetration by a called program.

It is another object of the invention to provide such a security mechanism in a modular, or hierarchical, fashion such that whenever a program at any security level calls a lower-level program, the security checks to which memory accesses of the called program will be subjected must always include those which are applied to the calling program.

It is a further object of the invention to provide such a security mechanism wherein programs of any security level other than the lowest level may in turn specify and call other programs at a lower level and maintain complete security with respect thereto.

It is yet another object to provide such a system having the high security inherent with supervisor-assigned protection codes but at the same time having the facility of easily setting up an equally secure hierarchy for a running program.

It is a further object to provide such a security mechanism which is readily adaptable to existing computer architecture and data formats.

It is yet another object to provide such a system which is readily adaptable to a multi-programming environment.

It is a still further object to provide such a system which is readily adaptable to straightforward and available hardware implementation.

Other objects, features and advantages of the invention will be apparent from the following description of the preferred embodiment of the invention as set forth in the drawings and claims.

DESCRIPTION OF THE DRAWINGS

FIG. 2 comprises an organizational diagram for FIGS. 2A through 2F. FIGS. 2A through 2F comprise a combination logical schematic and functional block diagram, illustrating the structure of a preferred embodiment of the present system.

FIG. 3 comprises an organizational diagram for FIGS. 3A through 3D.

FIGS. 3A through 3D comprise a combinational logical schematic and functional block diagram of the Link Stack block shown on FIG. 2C.

FIG. 6 comprises an organizational diagram for FIGS. 6A through 6B.

FIGS. 6A and 6B show the instruction formats for the eight (8) unique instructions required by the operation of the system.

GENERAL DESCRIPTION OF THE DISCLOSED EMBODIMENT

The objects of the present invention are accomplished in general by a computing system having a hierarchical security mechanism included therein which permits programs running at given hierarchical levels to call sub-applications at lower levels, including means for preventing any program running at any given level from ever calling a sub-application at a level equal to or higher than its own. Means are included in the system for automatically allowing a program to progress from a higher-level software application to a lower level and allow the sub-application to return back to the originating higher-level application which called same.

The system includes means for assigning a protection field or password of a given maximum length to any program running on the system and further includes means for assigning a hierarchical security level to each program, which level determines how much of a particular protection field will be examined in order to satisfy the security requirements of the system. Stated differently, the hierarchical level of the program determines the size of the window or number of bits of the protection field to be examined upon each memory access. The system includes the necessary controls and hardware for allowing for a multiple set of sub-application programs to occur in a given program, wherein each new sub-application will run at a lower level than the one which called same. Level checking means are specifically provided so that at the end of a particular sub-application when the system is to return to the originating spot in the job instruction stream both a hierarchical level check and a protection field check is made to ascertain that the sub-application does in fact return to the proper link-back point in the overall instruction stream.

The system further includes a unique set of storage registers for storing linking information for each of the hierarchical levels allowable in the security mechanism, whereby a complete linking list is kept to permit the system to sequentially link to lower levels and successively return back to the higher levels from which the given sub-application originated.

A further feature of the system includes hardware and instruction sequences for permitting the entire contents of the special storage registers to be stored en masse in back-up storage whenever a problem is running on a multiprogramming machine and the time slot for the particular problem or program has terminated, or a higher-priority task intervenes. Further means are provided for recalling all of the required linking data from memory and returning it to the special linking storage registers when a time slot for the program is again made available to the system.

Figure 1:
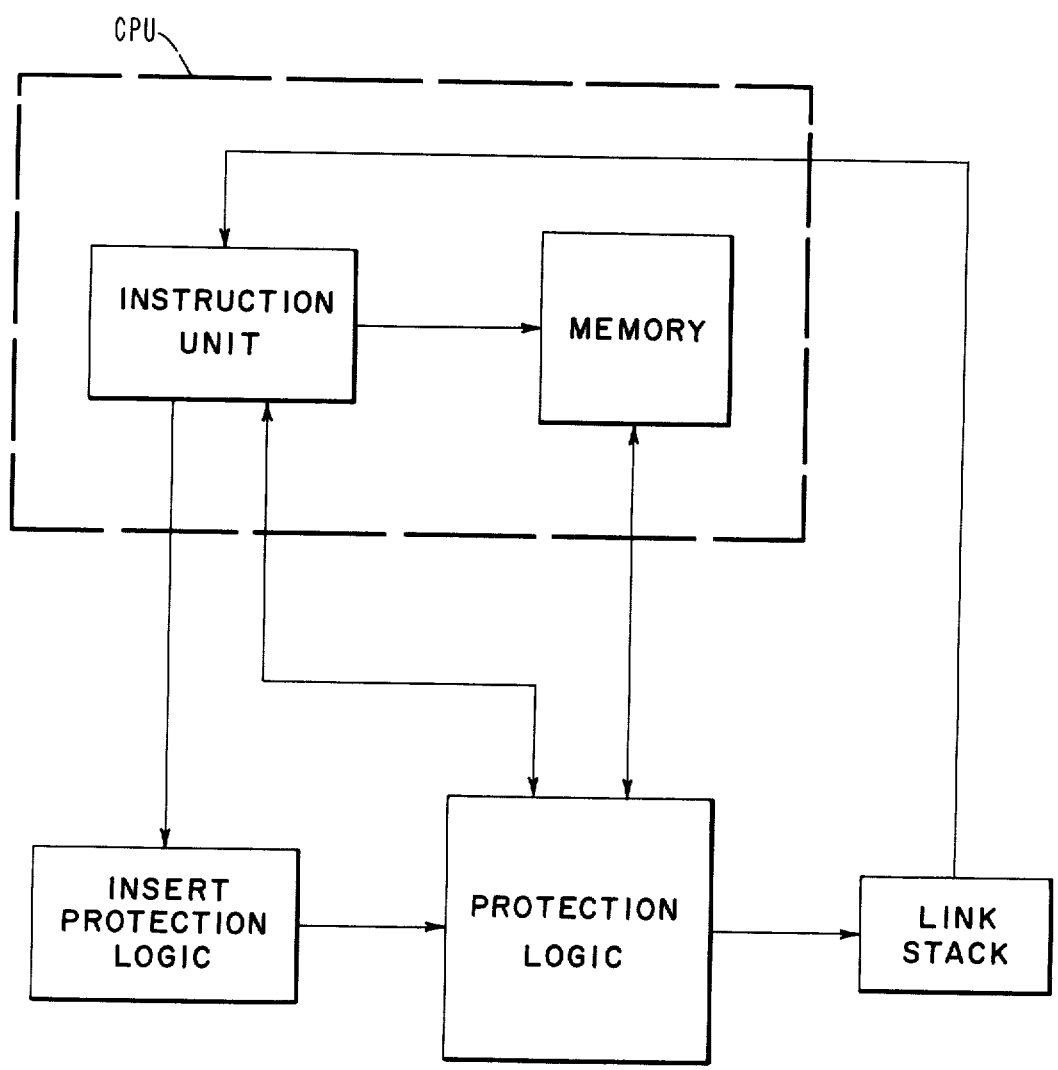
FIG. 1 is a functional block diagram of the herein-disclosed Hierarchical Security Mechanism.

The herein-disclosed hierarchical security mechanism is disclosed in detail in FIGS. 2A through 2F. FIG. 1 discloses the major functional components of the system. Referring to FIG. 1 it will be clearly understood that the control of the present embodiment centers around the CPU Instruction Unit and the Memory. As any instruction is accessed from memory and placed in the instruction unit or stored in memory, or conversely when any data operation occurs in memory certain security checks are necessary. The first and most basic is the conventional security password check which determines whether a particular memory storage or fetch operation meets the protection field or password requirements for the currently running program. This security check is basically conventional, however, the difference in the present system over conventional protection checks or keys is that only as much of the protection field as necessary for the currently running program is looked at. The amount looked at is contingent upon the current security level. As will be apparent from subsequent description, the higher the security level (the lower the number $n$) the smaller the protection field or window which is looked at. Thus, the program has a higher priority.

While the just-described feature is absolutely necessary for any such security mechanism to work, the more unique feature of the present invention is the portion which allows the setting up of the various hierarchical security levels and providing for the automatic storage of the hierarchical security information with each sub-application in memory, and for providing the mechanism which allows the protection portion of the instruction unit to permit branches from one sub-application to another at the user's option so long as certain security requirements are met.

As stated previously the most basic operating concept of the present invention is that any given program which has a given security level assigned to it by the operating system, which assignment is purely within the control of the password portion of the program which is resident in the operating system, can in turn call a sub-application which must by definition be given a lower hierarchical security level. In addition, this mechanism must obtain and keep track of the new protection field which must be assigned to the particular sub-application and which must also satisfy the protection field requirements of the calling program. The basic block which performs this function is the Insert Protection Logic Block shown on FIG. 1 and also on FIGS. 2D and 5. It should of course be noted that this is a great over simplification of the function, as the actual data which is sent to this particular block comes from many places in the system, under control of the specific 'insert protection' instructions and circuitry shown on FIGS. 2E and 2F.

The block on FIG. 1 labeled Protection Logic performs the various protection field comparison functions under control of the current hierarchical level requirement for the particular running program. In other words, the protection field which a particular memory operation must match, i.e., the protection criteria, comes into the top of FIG. 4 on cable 108 and the protection field of the memory location being accessed is brought in on cable 170 at the top of FIG. 4. Simultaneously the particular hierarchical security level information comes in on one of the eight lines designated by the reference number 185 at the left of FIG. 4, which information comes from the protection field over the cable 130 and out of the decoder at the bottom left-hand portion of FIG. 2C. An output on line 106 from the Protection Logic Block indicates whether or not the proper protection field is present. In the event that it is not, a security violation interrupt will occur.

Figure 2B:
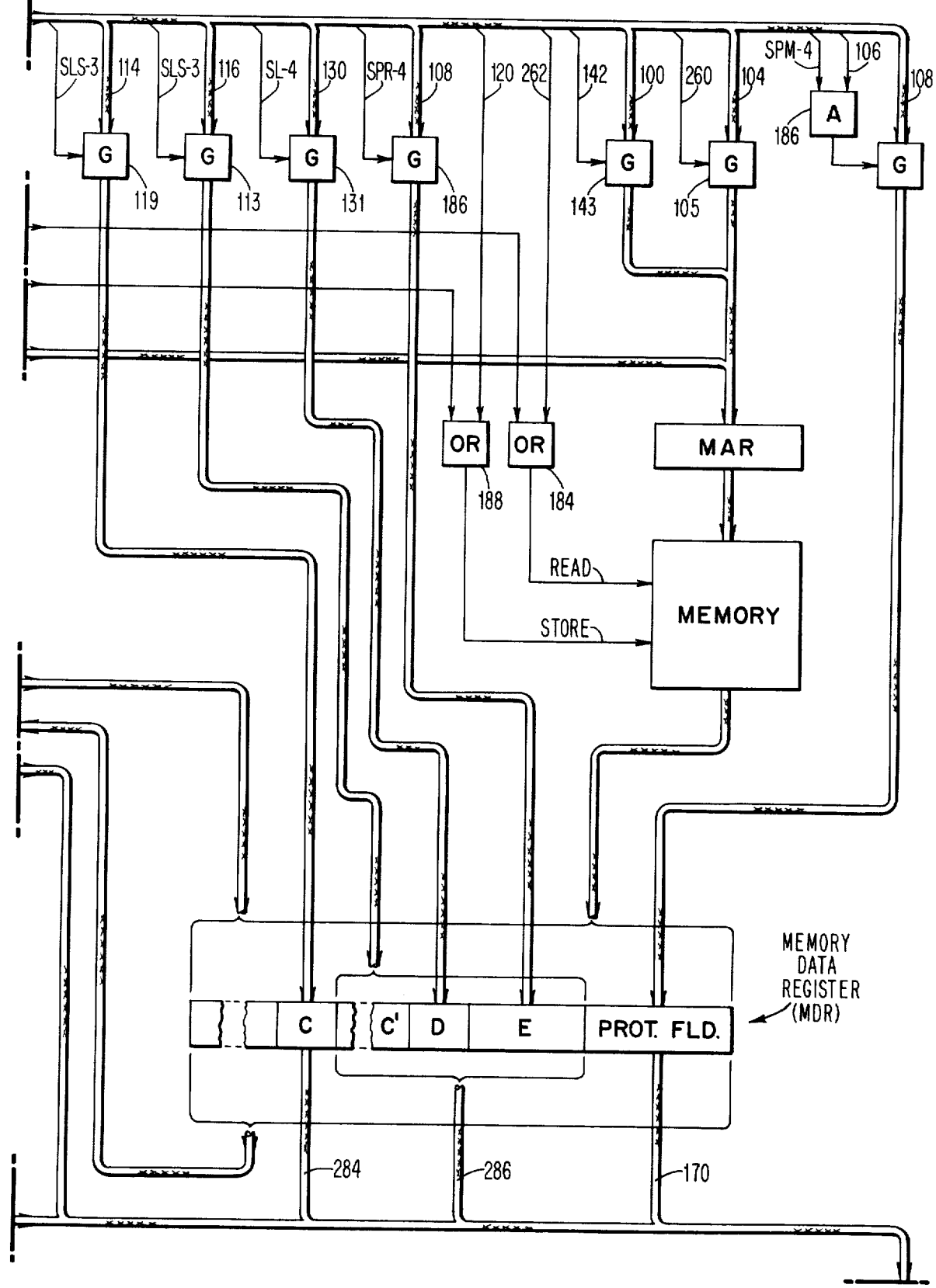
Figure 2C:
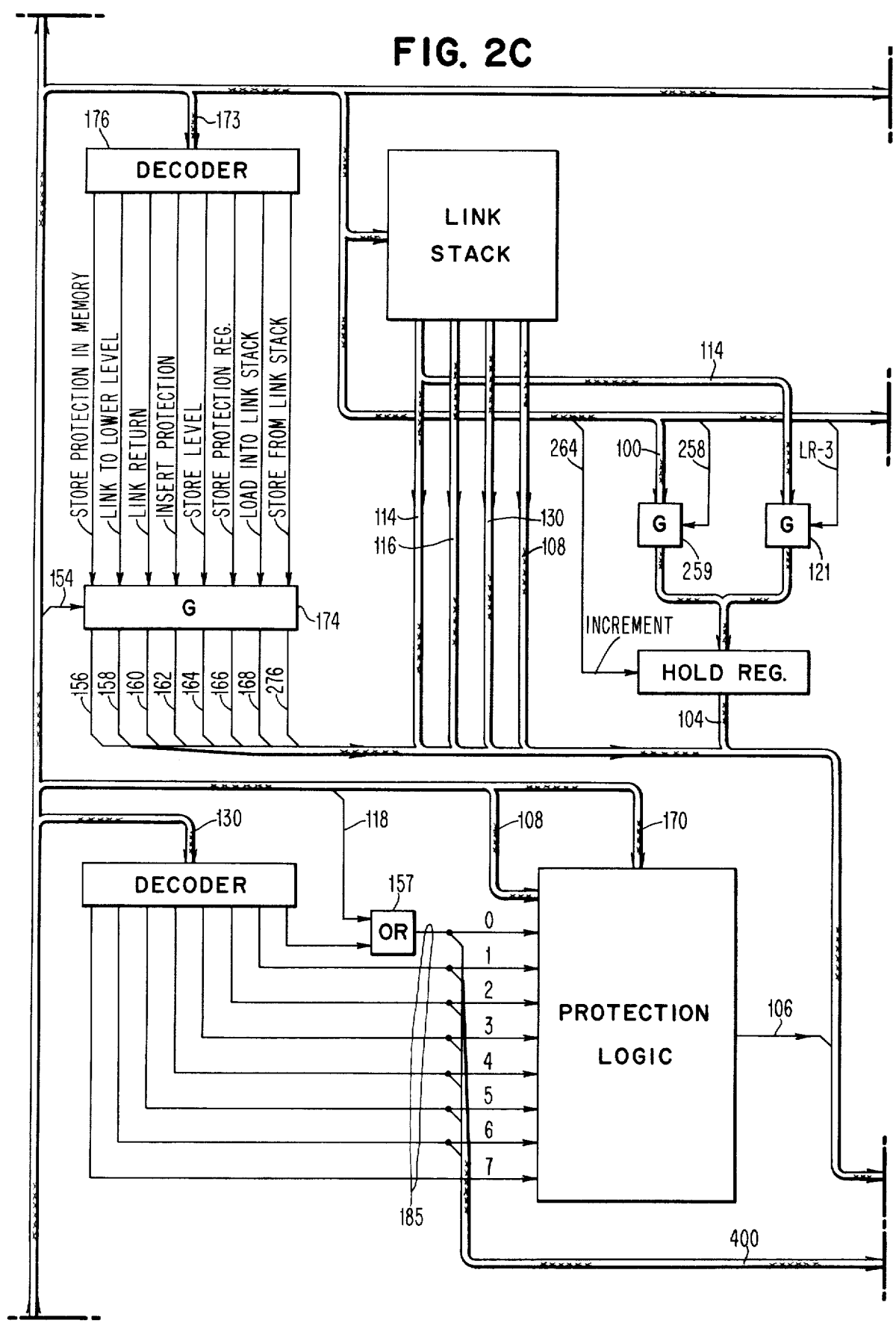
Figure 2D:
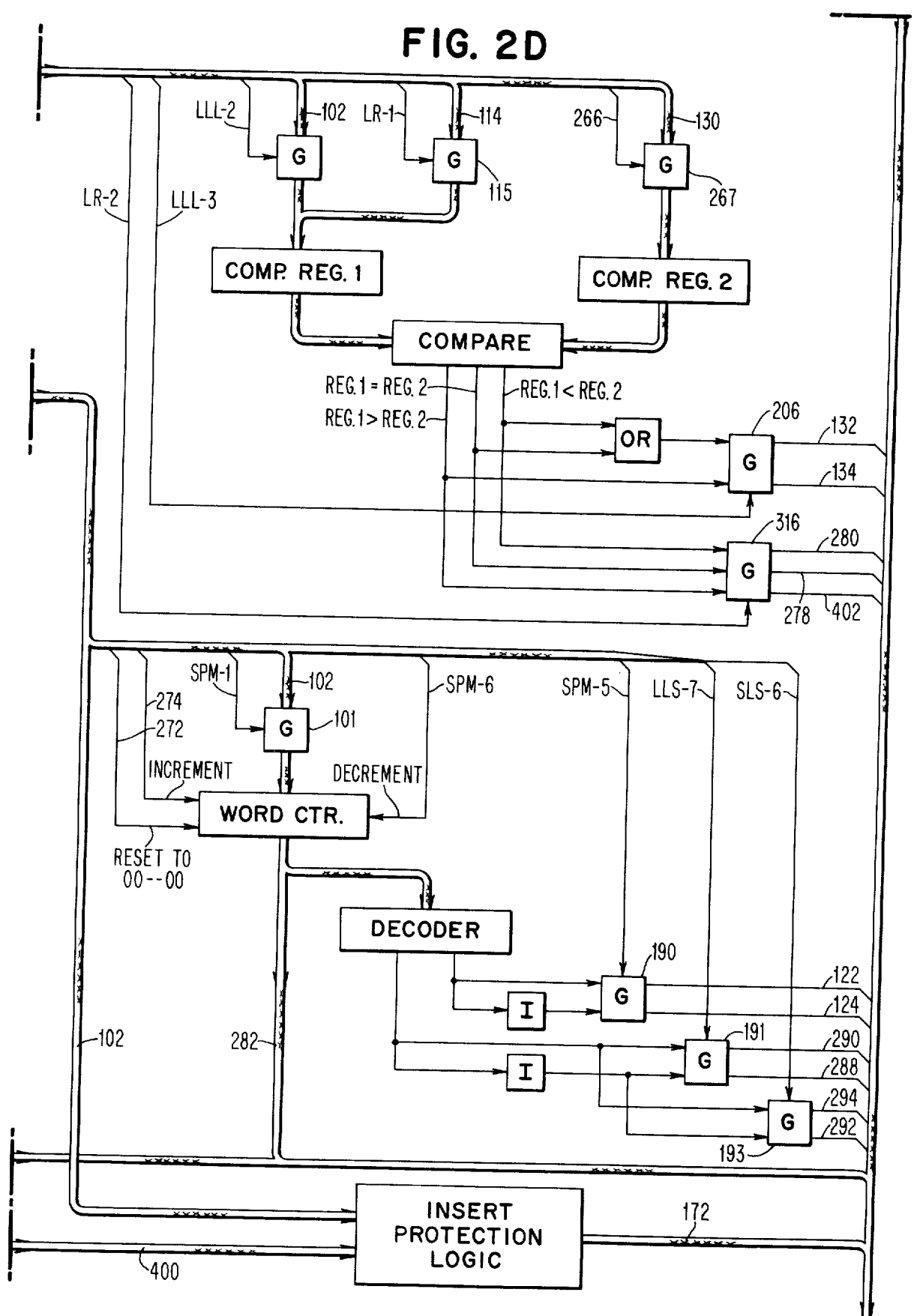

The final major functional block shown on FIG. 1 is the Link Stack which together with its associated control circuitry and functional units shown both on FIGS. 2C and 2D perform the heart of the control functions permitting the operation of the present hierarchical security mechanism. It is the link stack which is shown in detail on FIGS. 3A through 3D which allows a given running program to call up to eight hierarchical security levels within a given program stream (at one time) while maintaining complete memory security for all jobs at any level to which a given running program should not have access. The link stack serves as the mechanism for saving the link return addresses as well as assuring that the integrity of the security hierarchy control is maintained.

Having generally described the overall objects and features of the invention together with the just preceding general description of the main components of the operational hardware, there will follow a more detailed description of the operating philosophy followed by a description of eight novel instructions necessary to the operation of the present embodiment. It is the use of these special purpose instructions by the programmer running the system which allows the present hierarchical security mechanism to function properly as will be understood by those skilled in the art. While the particular instruction format and functions have been chosen to be the most direct method of accomplishing the objects of the present invention, it will be understood that many changes could be made by those skilled in the art without changing the basic function and concepts of the present hierarchical security mechanism.

The present invention permits selective access to sensitive data, by requiring that a clearance validation be passed for each access to memory. In contrast to other memory protection mechanisms, this invention enables the fineness of control to be as small as the fetch width of the storage medium. Usually a large memory block, consisting of 1000 bytes or more is controlled as a unit; either all words of the block are accessible or none are, in previous protection mechanisms. In addition, an application, constrained to certain areas of memory can itself control sub-applications and use the same protection mechanism to constrain a sub-application's ability to access the main application's memory. Hence, a hierarchy of access controls can be established.

To a very minor degree, a two-level hierarchy exists on today's hardware with respect to parity and/or ECC-bits. In "diagnostic-state" (available only to hardware maintenance engineers), the parity (or ECC) bits are accessible for reading and writing. In "non-diagnostic" states, these bits are not under program control, but if the hardware detects an incorrectly set parity or ECC bit, an error exception occurs.

For example, a "word" in an IBM Model 168 memory consists of 72 bits — 64 data bits and 8 ECC bits; a "word" or byte on tape or in an IBM Model 20 memory consists of 9 bits — 8 data bits and a parity bit.

Additional non-data bits (called a protection field) are included with each storage word, and a hierarchy of control states is utilized. Non-negative integers (levels) are assigned to the control states, and a special register (level register) is provided to indicate the level at which the program controlling the CPU is running. For a program running at level $n$, all but the leading $n$ bits of the protection field are accessible to the program for writing (for protection code purposes). The leading $n$ bits of the protection field must agree with the leading $n$ bits of a protection register for a memory access to be valid. Thus level 0 is the most privileged, since 0 bits are checked, and all protection bits may be modified. In addition, all bits except the leading $n$ bits of the protection register may be modified by a program running at level $n$.

If the level register is $k$ bits long, then ($2^k$) control levels are possible, and the protection fields and protection register can be up to ($2^k$) − 1 bits long. As many as ($2^k$) − 1 different protection field patterns are possible. A program running at level $n$ can distinguish between as many as $2^{(m-n)}$ subprograms running at level $m$, where $m \leq k$.

A program running at level $n$ may initiate a subprogram at level $m$, provided that $m > n$. Before doing so, it sets bits $n$ through $m - 1$ of the protection field at each memory word to match that pattern in all words in which that subprogram is to have access. Other data words would have a different pattern in those protection field bits. If a subprogram at level $m$ attempts to access a word for which the leading $m$ protection field bits do not match the leading $m$ bits of the protection register, a security violation occurs.

A subprogram at level $m$ cannot return control in an arbitrary fashion to level 1, with $1 < m$. A standardized linking mechanism is provided, which insures that when a subprogram at level $m$ relinquishes control to a higher level, control returns to the program which initiated the given terminating subprogram, at the same level as that which the initiating program had had when it gave control to the lower-level subprogram.

The control hierarchy may be viewed as presenting different size windows through which memory words can be seen. At the higher levels, (smaller values of $n$) the view is wider. The unseen bits determine whether access to a given word should be permitted at all.

The above concepts are made more concrete by describing an extension of the IBM System/370 which would easily accommodate the present security control hierarchy.

To avoid using more memory space than is used at present (there is 1 "redundancy bit" for every 8 data bits, or 8 "ECC bits" for every 64 data bits in a 72-bit word), and so as still to have space for a protection field, a memory organization is assumed in the present embodiment which uses a bandwidth of 144 bits, of which 128 are data bits. (This retains the 8/9 fraction of data bits which the IBM System/370 currently uses.) Now, ECC for a 144-bit word requires only 9 bits, (Peterson, "Error Correcting Codes," MIT Press, 1961) thus leaving a 7-bit protection field for the security control hierarchy.

In addition to the 144-bit word, the following is required: There is a link stack consisting of eight registers, corresponding to integers 0–7. Each link stack register consists of two fields: a level field (3 bits) and an address field (24 bits).

Link stack register 0, however, is treated differently;
 (a) the level field is "hard-wired" to 000.
 (b) the low order 7 bits of the address field of link stack register 0 are treated as the 7-bit protection register.
 (c) bits 5, 6, and 7 of the address field of link stack register 0 are treated as the 3-bit level register.

A description follows of a set of eight instructions to be added to the operation repertoire of the computer to facilitate the manipulation of these registers in order to realize the control hierarchy.

It is emphasized that the control hierarchy is designed to give an application running in problem state the ability to control its storage. Thus, most of the instructions are available in problem state. A small number of additional instructions are needed so that an operating system can switch use of the control hierarchy from one user program to another user program.

Note that the checking of the protection bits on data fetch takes place only in problem state. If the level register contains the integer $n$, where $0 \leq n \leq 7$, then the leading $n$ bits of the protection field of a data word must match the leading $n$ bits of the protection register. On store operations, the leading $n$ protection bit of the target of the store must match the leading $n$ bits of the protection register for the store to be valid.

GENERAL DESCRIPTION OF THE EIGHT SPECIAL INSTRUCTIONS

As stated previously the special hardware of the present hierarchical security mechanism as set forth in FIGS. 2A throuth 2F, 3A through 3D, 4 and 5 operates automatically when a particular program is running in problem state. During such normal problem-state running the protection field of any and all memory operations is automatically checked in much the same way as in any conventional password-type security system. A significant exception of course is that, depending upon the particular level at which a particular program is running, a greater or lesser number of protection bits will be checked by the system.

It is the original writing and entering of the program or set of hierarchical programs onto the system that requires the use of the special purpose instructions which set up the necessary security data and specify the operations required to activate the present hierarchical security mechanism.

It will be apparent from the following description that some of the instructions are available only to the supervisor, i.e., during supervisor state, and that other instructions are available in both supervisory and problem state. One instruction has somewhat different effects in the two states.

It will of course be obvious to those skilled in the art that those instructions available only during supervisor state form part of the privileged set of operating instructions of the system which are not available to the problem programmer and that to make the same available would in all probability allow such problem programmer to bypass the present security mechanism.

It will further be noted in the following specific description of the operation of the hardware that the present security mechanism comprises eight separate subsystems or hardware sequences which correspond exactly to these eight special instructions. Similarly the operation sequence charts, appearing subsequently in the specification, set forth the sequence of hardware operations which occurs when any of the eight special purpose instructions is encountered in the instruction decoder. A typical sequence of operation of the system utilizing the instructions is included in the example which will follow subsequently.

Figures 6, 6A:
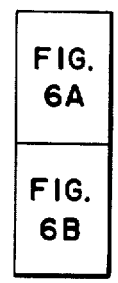

The order in which the instructions are described corresponds to their order on FIGS. 6A and 6B, but does not necessarily correspond to their invocation in a particular sequence of operations of the system. The following description of the instructions is functional in nature, in that it describes in functional format what happens in the system. For a detailed step-by-step operational description of the hardware, reference should be made to the subsequent detailed description of the operations and the operational sequence chart.

1. STORE PROTECTION IN MEMORY

This instruction specifies that beginning at the 16-byte word specified by the field of the instruction entitled, "Address in Memory" and for as many immediately subsequent 16-byte words as are specified by the field indicated as "Number of Words," the following operations occur. If the leading $n$ bits of the protection field and protection register match (where $n$ is the contents of the level register if in problem state, or 0 if in supervisor state) then the protection field in memory is replaced by the contents of the protection register. No special test is made for this match, as the appropriate test is precisely the one applied to every data fetch operation, and to every data store operation. See infra, "Check Data Fetch" and "Check Data Store" for details.

What this instruction does in problem state is allow a program to partition its own memory in preparation for calling a subprogram to which it does not allow access to all its data. Thus, in problem state, a programmer is required to stay within his previously assigned bounds of memory which requires a check of the protection field up to the first $n$ bits. Assuming this matches, then the program can specify further protection bits for the sub-program as well as a more restrictive security level, i.e., make $n$ larger. The reason $n$ is taken to be 0 in supervisor state really restates the notion that when the computer is in supervisor state, memory is possibly being initially allocated to applications by the operating system. In this situation there would be no protection field against which to check the protection register, as the memory assignments for a particular protection code (i.e. program) are just being initialized.

If the required number of bits in the protection fields fail to agree, no change in the state of memory is made, and a security violation #1 is signaled. This indicates that the particular region of memory into which it is desired to store a particular protection code has not been assigned to the given application program.

2. LINK TO LOWER LEVEL

When this instruction is encountered the following things occur. In problem state the level field is checked against the current value $n$ in the level register and, if it is greater, the following actions occur. First the current value in the level register (which is known to be less than the level value in the instruction) is stored in the level field of the I-th register in the link stack (where I = level designation in the instruction). Next the updated instruction counter which is the link-back address into the instruction sequence is stored into the address field of the I-th register in the link stack. The branch address field of the LINK TO LOWER LEVEL instruction is gated into the instruction counter and the value of I from the level field of the LINK TO LOWER LEVEL instruction is gated into the level register on FIG. 3B. What this does is to cause the system to run subsequently under the control of the lower level program. The new level-specification means that more bits of the protection fields are checked. In addition, the linking mechanism is activated so that the program will branch back into the original program stream at the proper location upon termination of the current sub-application program being executed.

Assume now that the value of the level specified in the level field of the LINK TO LOWER LEVEL instruction had been equal to or less than the current value $n$ stored in the level register. This would indicate that a security violation #1 has occurred. This causes a system interrupt. The security violation #1 indicates in this case a level violation; i.e., an attempt is being made to go into a prohibited hierarchical level of the system. When this violation occurs the protection field match is never even attempted.

If on the other hand the system had been in supervisor state when the LINK TO LOWER LEVEL instruction was encountered, the specific level I in the level field of the instruction register simply replaces the contents of the level register on FIG. 3B. Additionally the level field of the I-th link stack register is set to I, the "branch address" field of the instruction replaces the current contents of the instruction counter, and the problem state is entered. The difference in effect of this particular instruction in problem state and supervisor state is as follows.

The purpose of the LINK TO LOWER LEVEL instruction in problem state is to invoke a sub-application which runs in a more restricted environment (i.e., $n$ is a larger number) than the caller. The link stack is inaccessible to programs running in problem state, except by the LINK TO LOWER LEVEL instruction, and the LINK RETURN instruction, described next.

The purpose of the LINK TO LOWER LEVEL instruction in supervisor state is to permit an operating system to assign an application to any protection level as more restrictive than what a statement of the application's requirements would impose. In this way, a supervisor-state program can reserve leading protection bits of the secure control mechanism for its own use.

The link stack, with these two instructions, (LINK TO LOWER LEVEL and LINK RETURN), provides a controlled means of accessing lowerlevel programs and guaranteeing their return to the proper caller at the proper security level (i.e., of the caller).

3. LINK RETURN

As will be apparent by referring to the instruction format on FIG. 6A this instruction is encoded simply as an operation-code which initiates the appropriate sequences of hardware operations to take the system from its current hierarchical running level back to the last previous lower level (from which it was called). This is done in the following manner. Let $n$ be the contents of the level register. If the contents $k$ of the level field of the $n$-th register of the link stack are less than $n$ this will mean that the current instruction sequence was called from the lower priority level $k$. This of course is proper, and is the condition which the system would expect to find. At this point the linking mechanism functions to replace the contents of the instruction counter by the address field of the $n$-th register of the link stack which returns the system to the proper place in the instruction sequence of the initiating program and, by placing the contents $k$ of the level field of the $n$-th register of the link stack into the level register on FIG. 3B, the proper hierarchical level of the initiating program is returned into this control register and the original program will regain control of the system.

If however, the level field of the $n$-th link stack register is equal to the contents of the level register a security-violation #2 interrupt occurs. Such a situation would occur when a program was running at the level at which a supervisor-state program initiated it, erroneously issuing a link-return instruction, or deliberately issuing it as the normal exit from the security-control subsystem. It is important to note that the present invention permits any computing system in which it is installed to function as at present, should that be desired, merely by setting the contents of the end register to zero.

Another possible condition which might be encountered would be where the level field of n-th the link stack register is actually greater than the contents of the level register, causing a security-violation #3 interrupt to occur. This is a condition of operation which would not arise naturally within this system, and would probably be due to improper initialization of the link stack by a program in supervisor state, or else by some hardware malfunction. Use of the LINK TO LOWER LEVEL instruction and LINK RETURN instruction in problem state cannot lead to this condition.

#4. INSERT PROTECTION

This instruction is used in problem state by a calling program to specify the protection bits which a sub-application is to utilize. It performs the following function. If the contents of the level register are $n$, then the lower order $7 - n$ bits of the "protection bit" field in the instruction register replaces the low order $7 - n$ bits of the current protection register.

It should be noted in passing that the high order $n$ bits of the two registers should normally match, but this will not be tested for.

In supervisory state, all 7 bits of the protection register are replaced, whatever the contents of the level register. This allows the supervisor to restore the state of a problem program before returning control to it.

#5. STORE LEVEL REGISTER and #6 STORE PROTECTION REGISTER

These instructions provide for the storing of the current contents of the level register and protection register, which are together the first register of the link stack shown on FIGS. 3A and 3B. The use of these instructions will be shown subsequently in the example and the precise reason for their invocation at a particular point will be apparent from the example. However, generally the two instructions are utilized concurrently.

Providing that the "word" specified by the "address" field of either of these instructions is accessible, the current contents of the level register or of the protection register are stored right-adjusted at the address specified by the "address" field of the instruction. If the target or store location is not accessible this means that the protection fields did not match the protection register and a security-violation-1 interrupt occurs.

These instructions are always valid in supervisor state, and are valid in problem state whenever the leading $n$ bits of the protection register agree with the leading $n$ bits of the protection field of the word into which storage is to be made.

#7. LOAD INTO LINK STACK

Special instructions #7 and #8 are provided to allow the present hierarchical security mechanism to be utilized in a multi-programming environment, or among several different applications, each one of which wishes to use the instant hierarchical security mechanism. The instructions are valid only in supervisor state and, as will be apparent to those skilled in the art, are necessary to maintain the status information for the current running program. As will be readily appreciated this is because it is necessary for the current running program to be able to return after an interruption to the precise point of interrogation in the execution sequence when it once again is allocated the CPU. Conventional Operating System sequences take care of the contents of the instruction registers, instruction counters, etc. however, as will be apparent, it is also necessary that the system have a copy of the link stack in memory at the time that any given application program is quiesced, and additionally have the facility to restore the contents of the link stack. Hence, the requirements for instructions #7 and #8.

The LOAD INTO LINK STACK instruction contains two significant fields "operation code" which merely specifies the operation which is to occur and the "address" field which specifies that the contents of the eight 4 byte words beginning at the specified address are to be extracted from memory and loaded into the eight link stack registers. Specifically for each 32 bit memory word, bits 5–7 go into the level field of the link stack registers, and bits 8 through 31 go into the address field for the right-hand portion of the link stack registers shown on FIGS. 6A through 6D. Bits 0–4 of each memory word are ignored, as they are not required.

#8 STORE FROM LINK STACK

This instruction is the opposite of the LOAD INTO LINK STACK instruction, in that it causes the contents of the link stack to be placed in memory at the beginning at the address specified by the "address" field of the instruction. Thus, the instruction causes the content of the eight link stack registers to replace eight consecutive 4-byte words of memory, beginning at the address in memory specified by the previously described address field. For each link stack register position, the level field replaces bits 5 through 7, the address field replaces bits 8 through 31, and bit 0 through 4 remain unchanged.

Thus, it will be apparent that these two instructions allow the link stack information to be retained at the desired point in time and then returned to the link stacks when necessary. It will of course be obvious that these instructions are only needed and thus are callable only in supervisor state under control of the operating system which controls all multi-programming operations.

EXAMPLE

The following is an example showing the use of the eight special instructions described in detail previously, insofar as their functional relationship to the present invention is concerned. The example illustrates the way in which these instructions may be used by a problem or application programmer, making use of the present hierarchical security system, wherein he wishes to call various sub-applications and limit their access to the system memory as permitted by the hereindisclosed hardware configuration.

The example also demonstrates how the system programmer, writing supervisory-state operating-system modules, can provide the means whereby an application programmer can make intelligent use of the hierarchical security mechanism provided herein, for the purpose of isolating from one another those identifiable parts of his application which should not interact directly.

It is assumed first that an application program, of any sort whatever, is to be run, with input and output requirements. It is assumed that "INPUT" and "OUTPUT" routines exist in the supervisor whose entry points are at the indicated labels (known addresses). It is also assumed that a supervisory call (SVC) instruction set exists as in the IBM System/370 computers. It is still further assumed that some single SVC instruction will be interpreted by the operating system as a request for the present hierarchial security mechanism to be switched on. It is noted that a level indication of zero corresponds nicely to the notion of being switched "off", and it is so regarded: all other states (i.e. 1–7) of the mechanism are "on". It is further assumed that means are provided in the instruction unit for control to be returned to the requesting program when the next (not part of the present set) instruction is fetched. Finally it is assumed that this SVC "expects" to use a previously-designated register for communication of a very small but highly useful amount of information; to wit, the operating system should find in the designated register a statement of how many lower levels in the secure control hierarchy, at most, the requesting program may require the ability to assign. This information must of course be provided by the programmer writing the program and making such requests.

On receiving a request to turn on the hierarchical security mechanism with provision for $n$ lower levels, the operating system first must check that the current level of the application program plus $n$ does not exceed seven, which is the lowest level which can be provided. If this test fails, the operating system "ABENDS" the application; otherwise control is returned to the application.

The application can determine its own current level by means of a Store Level Register (SL) instruction. If the stored value is $k$, then the leading $k$ bits of the protection fields are not available. The application can initialize all of its working storage by storing the current protection mask in all of its data areas by means of a SPM (Store Protection in Memory) instruction. It can then initialize the dedicated storage areas for the INPUT and OUTPUT subprograms, by forcing the $k+1$st bit of the protection field in the storage areas for these programs to have opposite value to that which the application gave to itself. The $k+2$nd bits of the protection fields for both applications are forced to be different, thereby guaranteeing unique, disjoint working storage for both subprograms.

The masks for the subprograms may be generated by 1) shifting right by $k$ bits, the binary patterns, 1000000 and 1100000, and 2) exclusive-oring the result of the shifts with the protection mask of the application. The leading one bit of the above-mentioned patterns will force the $k+1$st protection bit to disagree with the $k+1$st protection bit of the application, as discussed in the preceding paragraph. The second bits of the patterns, being different, will force the $k+2$nd bits of the generated masks to be different from each other. Of course, while the main application is running, the $k+1$st and the $k+2$nd protection bits are not examined by the hierarchical control, so that the application is free to set them as it determines.

By requesting that the Operating System verify that sufficient levels are available, the application can itself be used as a subapplication in a larger system. The application will be able to run at level 5 or higher.

The "Store Level Register" instruction will subsequently permit the requesting program to ascertain its own assigned level. (Of course, there would be no need to communicate a requirement if the assigned level were always to be the same, say zero.)

It should be noted in the subsequent program listing, that before requesting that the operating system switch "on" the present hierarchical security mechanism, the program puts the number 2 into the previously described special communications register.

Before calling the input or output routines, the program discovers its own level ($k$) and its own protection key (equal to the left most $k$ bits of the protection register). The program then divides its memory space into three parts.

| | | |
|---|---|---|
| a) Its own, strictly | - - - - coded | ←k→ 00 - - - - - |
| b) Its input area | - - - - coded | ←k→ 10 - - - - - |
| c) Its output area | - - - - coded | ←k→ 11 - - - - - |

The system uses the SPM instruction to implement this partition. The effect of this coding is that the program can call the input program after having extended the protection field in the protection register by appending "10" in the $(k+1)$ and $(k+2)$ - th positions, or the output program by using "11", and the called programs will have access to no area of memory not accessible to the calling program, and only to its designated portion of that.

The first shown LR instruction returns control from the input or output subroutine to the calling program, and the calling program's security status ($k$) is restored. The second shown LR instruction announces that the application is finished with the hierarchical security mechanism, and is thus the normal exist from any use of the hierarchical security mechanism. It causes transfer of control to a fixed location in the operating system (as did the SVC) in supervisor state where this class of request is normally processed.

It should be noted that besides the SVC instruction, the following instructions have been used:
LLL from supervisor state
LLL from problem state
LR returning to each of these cases
SPM to partition memory
IP to set up protection register for SPM
SLR to ascertain a level. (No use was made of the instruction SPR, but by careful documentation of the program which has been described the use of SPR would necessarily be described in a self-documentation step to "complete the file.")

Were it to be necessary for the operating system to interrupt at any time, and for any reason, the running of this program (even though one of its subprograms might at the time actually "have the CPU"), a simple SLS instruction would at that time be issued by the operating system and would preserve all necessary information to enable a simple LLS instruction to subsequently restore the program at a future time, so that the run could be resumed. There is an implicit assumption that all information relative to the currently running program including all status registers and other working registers that would normally be saved in any such system mechanism, would also be saved and restored in this situation. However, this latter information is and procedures are, well known, and are not specifically dealt with here. The SLS and LLS between them account for all the additional overhead incurred by the use of the herein disclosed hierarchical security mechanism.

It may be in special cases necessary to re-code the protection field in some memory areas, in case for example, the operating system has assigned protection codes to different applications, one of which codes is an initial segment of the other. However, this would be obvious to programmers skilled in the art and could automatically be provided for by such a programmer without significant difficulty.

The initiation of any of the eight special instruction sequences is caused by such an instruction's operation code (OP Code) appearing in the Instruction Register shown on FIG. 2A. The occurrence of these instructions in the main program instruction stream will as explained previously, have been taken care of by the system programmer, thus, the instructions will automatically be loaded into the Instruction Register by the

| Label | Opcode | Operands | Comments |
|---|---|---|---|
| first | la | 1, = f'2' | Parameter to indicate two levels needed. |
| | svc | HM | Supervisor call for hierarchical control |
| | slr | level | Store current level |
| | spr | pmask | Store current protection register |
| | l | 2,level | Move current level to a register |
| | la | 5,2(2) | Compute level of subprograms (2 + current level) |
| | sth | 5,inl + 2 | Store in link to input instruction |
| | sth | 5,outl + 2 | Store in link to output instruction |
| | spm | first,last-first + 1 | Store protection register for application. |
| | l | 3,b'1000000' | Generate protection mask for input routine |
| | srl | 3,0(2) | Shift right k bits (k = current protection level) |
| | x | 3,pmask | Generates mask for input |
| | sth | 3,inmask + 2 | Save mask in 'insert protection' instruction |
| | l | 4,b'1100000' | Similar procedure for output routine |
| | srl | 4,0(2) | |
| | x | 4,pmask | |
| | sth | 4,outmask + 2 | |
| inmask | ip | ** | Insert protection for input (filled in by the sth 3, inmask + 2) |
| | spm | inarea,100 | Set unique protection field for input routine |
| outmask | ip | ** | Similarly for output routine |
| | spm | outarea,100 | |
| loop | ex | inmask | Set up protection for input routine. |
| inl | lll | input,** | To input routine, level computed by sth 5,inl + 2 |
| | ltr | 15,15 | If return code in R15 > 0, no more input |
| | bz | process | |
| | lr | | If no more input, return |
| | | | Note: that return is by link-return instruction. Control goes |
| • | | | to higher level application, or, if current application was at |
| • | | | highest level, to the Operating System. |
| process | — | | Instructions to process data |
| • | | | Note: that main application has access to input and output areas. |
| | — | | — |
| | — | | — |
| | — | | |
| outl | lll | output,** | Now, go to output routine. |
| | b | inl | Get more input |
| | — | | Other data areas, not accessible to I/O routines |
| input | — | | Input subprogram |
| | — | | |
| | lr | | Returns by means of link-return instruction |
| output | — | | Output subprogram |
| | — | | |
| | lr | | Returns by means of link-return instruction |
| inarea | ds | 100C | Reserve input area |
| outarea | ds | 100C | Reserve output area |
| level | ds | f | Additional data areas, accessible only to main application |
| pmask | ds | f | — |
| | — | | — |
| | — | | |
| last | equ | * | Mark end of application |
| | end | | |

DETAILED DESCRIPTION OF THE OPERATION OF THE DISCLOSED EMBODIMENT

The following is a detailed step-by-step description of the specific operational sequences which occur within the hardware shown on FIGS. 2A through 2F, 3A through 3D, 4 and 5. The description is organized in eight sections each of which represents the execution of one of the eight special instructions shown on FIGS. 6A and 6B. The currents of each of these instructions causes a particular sequence of operations to occur within the system.

Reference to the micro-sequence charts which immediately follows the detailed description of the sequence provides a much more compact description of the operations without the reference to detailed circuitry. Referring to the charts while reading the following detailed description will materially aid in an understanding of the operations occurring in each sequence.

Instruction Unit when required. As will be apparent, the Instruction Register has three fields. The left-most field is used for the operation code for the instruction and is appropriately labeled OP. The A and B fields are used for data and their use will be explained subsequently. The actual functional content is clearly set forth in FIGS. 6A and 6B for each of the eight special instructions. An Instruction Counter is also shown adjacent to the Instruction Register on FIG. 2A. This counter can be loaded by the Instruction Unit or by other means in the presently disclosed embodiment. It can also be incremented either by the Instruction Unit or by other means. The main Memory for the system is shown at the middle right-hand portion of FIG. 2B and would be utilized by the central processing unit in normal fashion and is also utilized by the special hardware disclosed in the present system for the purpose of obtaining a secure memory hierarchy.

The contents of the operation code field of the Instruction Register are transmitted via cable 173 to the upper left corner of FIG. 2C where this information is decoded by the decoder 176. After the Instruction Register is loaded by the CPU, a pulse would appear on wire 154 which extends to FIG. 2C and is applied to gate 174. Thus, one of the wires labeled 156, 158, 160, 162, 164, 166, 168 or 276 may become active and cause the execution of any particular instruction described in this embodiment.

Store Protection in Memory

The first execution sequence that will be described is called "store protection in Memory" and this is abbreviated "SPM." This sequence is started by the decoding of the appropriate instruction by the decoder 176 which produces a pulse on wire 156 which extends to FIG. 2E and is used to turn "on" single shot 178. This produces the SPM-1 pulse which, on FIG. 2F, extends through OR circuit 296 to wire 258. Wire 258 extends to FIG. 2C where a pulse on it is used to gate the A field of the Instruction Register to the Hold Register via cable 100. Also, on FIG. 2D, the SPM-1 pulse gates the B field of the Instruction Register (cable 102) to the Word Counter via gate 101.

On FIG. 2E, when single shot 178 turns "off", a pulse is produced which extends through OR circuit 180 to turn "on" the check pulse generator (CPG) indicated by the reference character 182. This pulse generator can consist of a series of single shots which function to deliver the pulse sequence SPM-2 through SPM-5 inclusive. These pulses are produced in succession. The SPM-2 pulse extends through OR circuit 298 on FIG. 2F to wire 260. Wire 260 extends to FIG. 2B where a pulse on it is used to gate the Hold Register (cable 104) to the MAR via gate circuit 105.

Figure 2F:
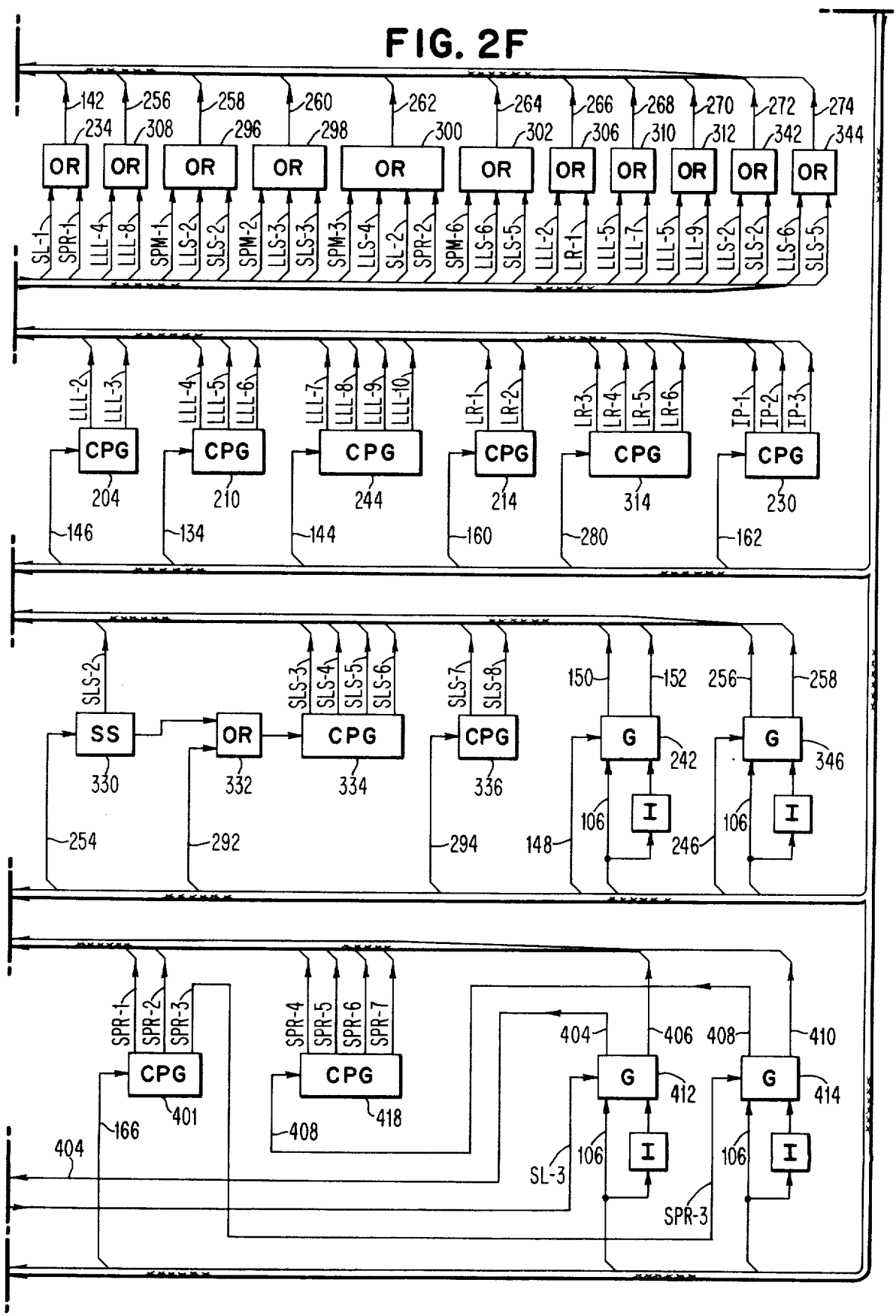
Figure 3C:
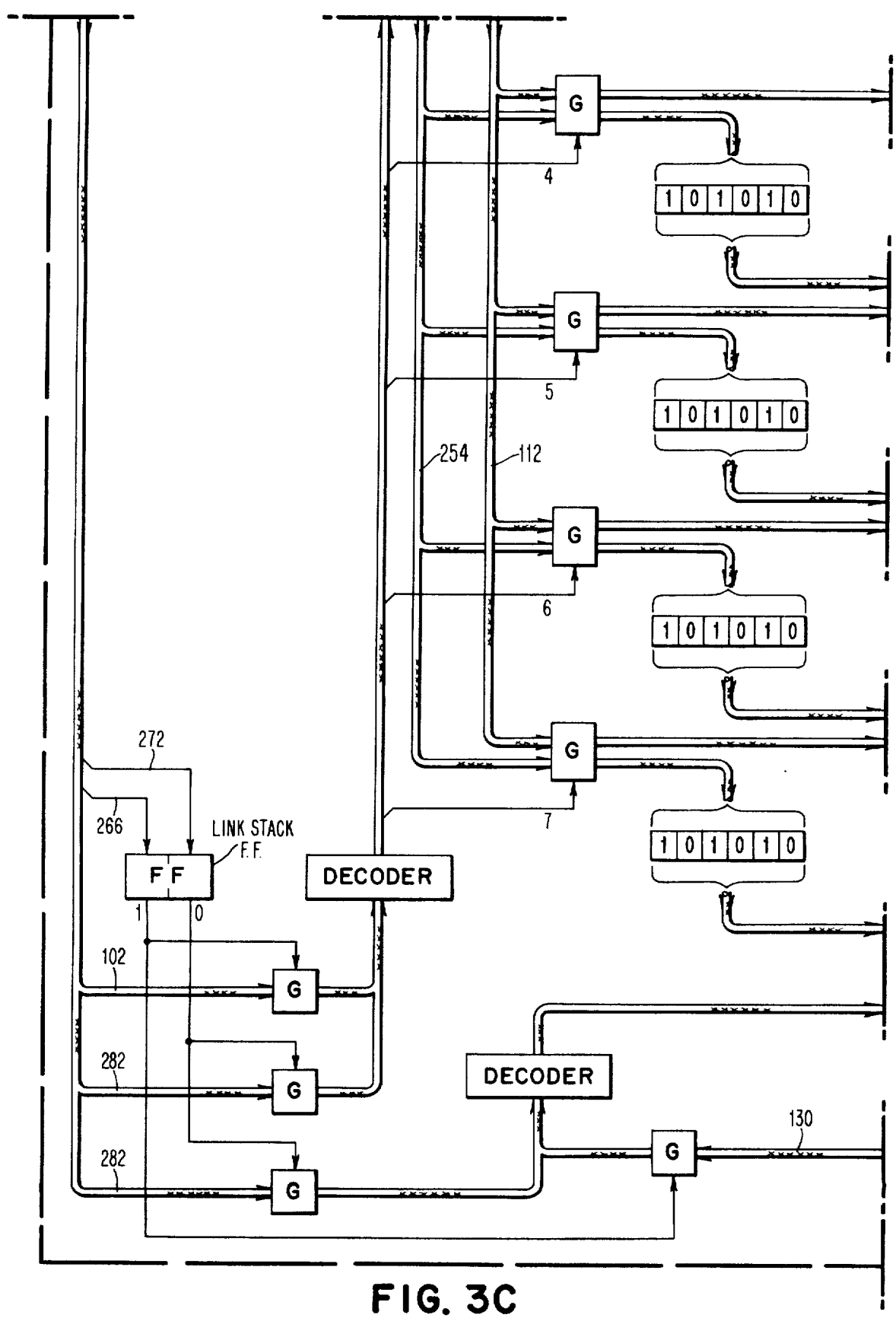
Figure 3D:
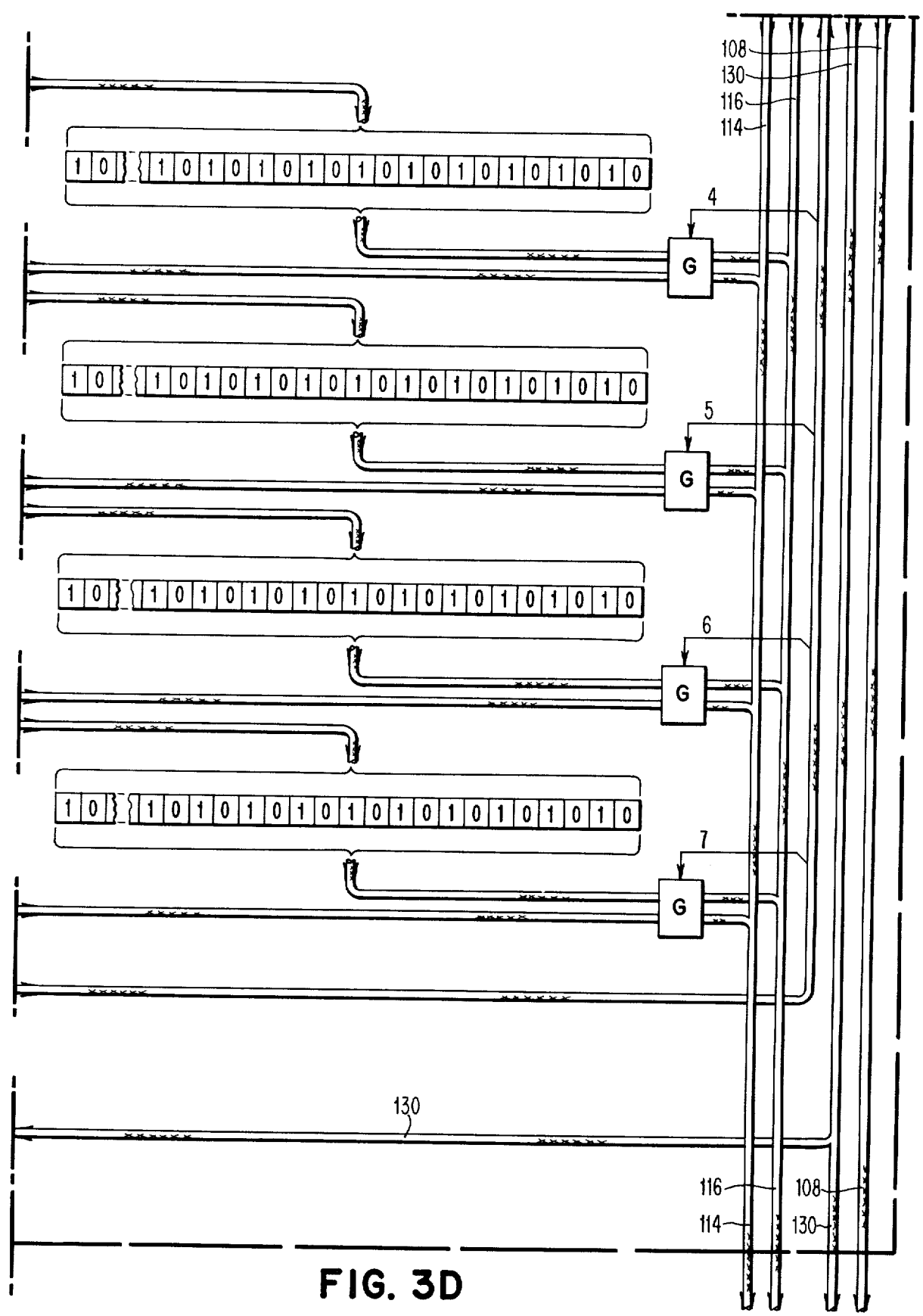

The SPM-3 pulse, on FIG. 2F, extends through OR circuit 300 to wire 262. Wire 262 extends to FIG. 2B where a pulse on its extends through OR circuit 184 to give a "read" command to the Memory.

On the upper right corner of FIG. 2B, the SPM-4 pulse is applied to AND circuit 186. If this AND circuit is enabled by the active state of wire 106, cable 108 which comes from the "Protection" Register (register 0 in the Link Stack) will be gated to the protection field of the MDR.

Figure 4:
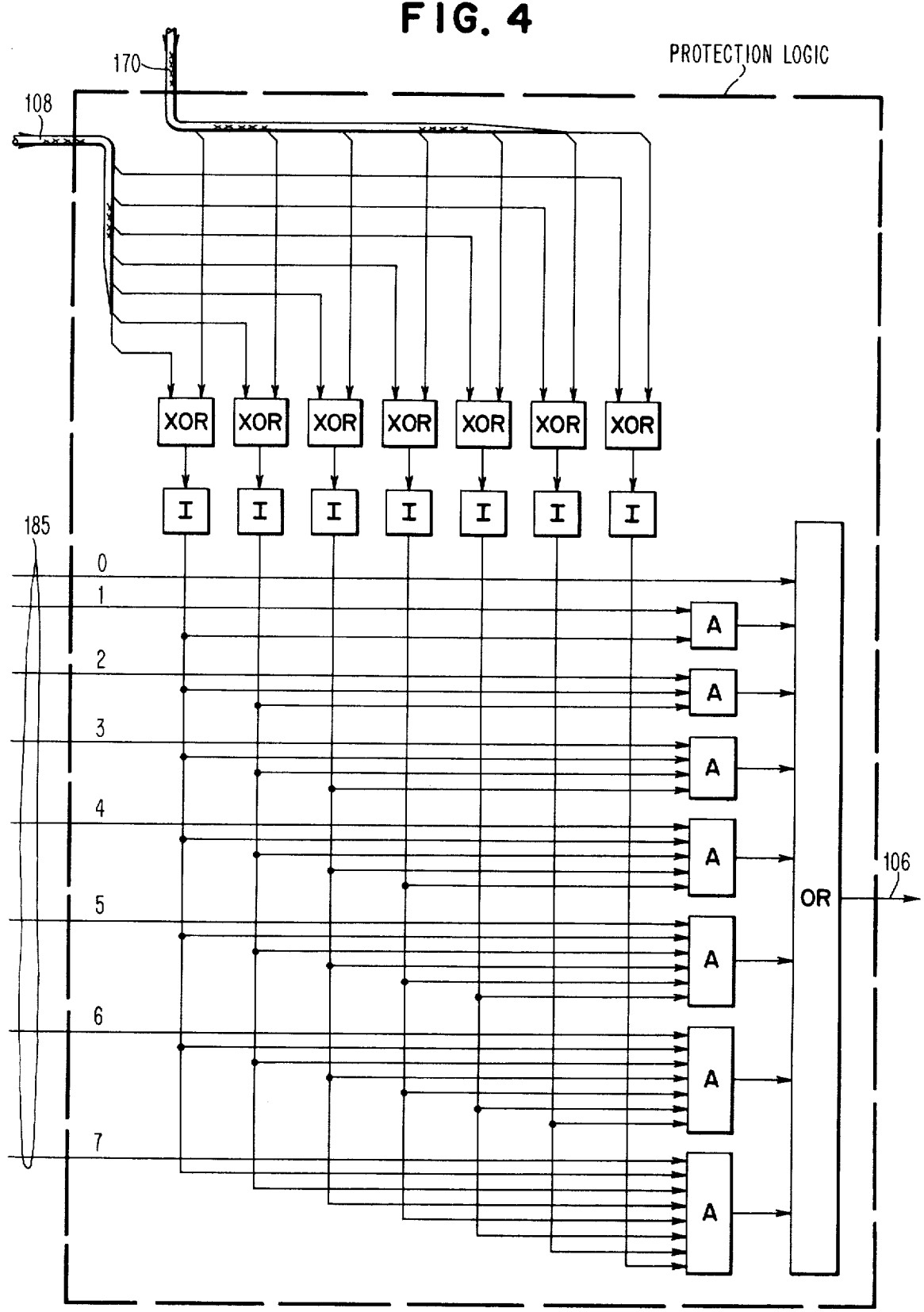
FIG. 4 is a logical schematic diagram of the Protection Logic shown at the bottom of FIG. 2C.

The way in which the Protection Logic, as shown on FIG. 4, works is as follows. The contents of the "protection" field of the MDR are applied via cable 170 at the top of FIG. 4 and the contents of the Protection Register are applied via cable 108 at the upper left of FIG. 4. The decoded value in the Level Register is applied to one of the wires 185 at the left of the sheet. If the value contained in the Level Register is zero, none of the bits in the protection field of the MDR have to agree with the corresponding bits in the Protection Register because it will be noted that the zero line of the lines 185 goes directly through the OR circuit and will appear on the output line 106. If the value contained in the Level Register is "1", the left-most bit in the protection field must agree with the left-most bit in the Protection Register before an output can appear on wire 106. If the value contained in the Level Register is "2", then both left-hand bits of the protection field must agree with the same two left-hand bits of the Protection Register before an output will appear on wire 106. This sort of thing continues up to the maximum value of "7" which can appear in the Level Register. If the value in the Level Register is "7", then all the bits in the protection field must agree with the corresponding bits in the Protection Register.

Thus, it will be noted that this is the operational sequence described previously wherein the number of protection bits which must be clocked is determined by the value ($n$) set in the Level Register.

If the machine is in the supervisor state, then the value in the Level Register is disregarded because it will be noted that in the lower portion of FIG. 2C wire 118, if active, can pass through OR circuit 157 and cause the zero line of the wires 185 to become active. Stated another way, if the machine is in the supervisor state or if the value in the Level Register is zero, then the machine can change all the bits in the protection field. When not in the supervisor state, the following is true. If the value in the Level Register is "1," then the machine can change the six right-hand bits. If the value is "2," it can change the five right-hand bits. If the value is "3", it can change the right-hand four bits, if the value is "4", it can change the right-hand three bits, if the value is "5", it can change the right-hand two bits, if the value is "6", it can change the right-most bit. If the value is "7", it cannot change any bits. As explained previously it is the value in the Level Register ($n$) which mandates how many bits of the protection field must be checked for valid operation of a given level program. The remaining $7-n$ bits may be changed by a given level program to effect control of lower level hierarchical programs called by it.

The SPM-5 pulse extends through OR circuit 196 on FIG. 2E to wire 120. Wire 120 extends through OR circuit 188 on FIG. 2B to give a "store" command to the Memory. Near the bottom of FIG. 2D the SPM5 pulse is applied to gate 190 in order to test the contents of the Word Counter. If the Word Counter is all zeros, a pulse will appear on wire 122 and, if this is not the case, a pulse will appear on wire 124. Wire 122 extends to FIG. 2E where a pulse on it is effective to start the pulse generator 192. This produces the SPM-7 pulse, followed by the SPM-8 pulse. Wire 124 also extends to FIG. 2E and a pulse on it will turn "on" single shot 194. This produces the SPM-6 pulse which on FIG. 2F extends through OR circuit 302 to wire 264. Wire 264 extends to FIG. 2C where a pulse on it is used to increment the Hold Register. On FIG. 2D, the SPM-6 pulse is used to decrement the Word Counter. On FIG. 2E it will be noted that when single shot 194 turns "off," a pulse extends through OR circuit 180 to again produce the pulse sequence SPM-2 through SPM-5.

The SPM-7 pulse is applied to OR circuit 200 on FIG. 2E, the output of which is wire 126 which extends to OR circuit 198 on FIG. 2A. The output of this OR circuit is used to increment the instruction counter.

The SPM-8 pulse is applied to OR circuit 202 on FIG. 2E. The output of this OR circuit, wire 128, extends to FIG. 2A and a pulse on it is used to request an instruction fetch at the top of the CPU.

Link to Lower Level

The next instruction to be described is called "link to lower level." This is abbreviated "LLL".

This instruction sequence is initiated by the instruction being interpreted by the decoder which activates the LLL line to produce a pulse on wire 158 which starts at gate 174 on FIG. 2C. Wire 158 extends to FIG. 2E where it is applied to the single shot 242. This produces the LLL-1 pulse.

The LLL-1 pulse extends to FIG. 2A where it is applied to gate 304 in order to test the state of wire 118. If wire 118 is active, a pulse will appear on wire 144. If wire 118 is not active, a pulse will appear on wire 146. These wires extend to FIG. 2F where a pulse on wire 144 will start pulse generator 244 which produces the pulse sequence LLL-7 through LLL-10, inclusive, and where a pulse on wire 146 will start pulse generator 204 which produces the LLL-2 and then the LLL-3 pulses.

The LLL-2 pulse on FIG. 2F, extends through OR circuit 306 to wire 266. Wire 266 extends to FIG. 3C where a pulse on it will set the Link Stack Flip-Flop to its "1" state. On FIG. 2D, the LLL-2 pulse is used to gate the B field of the Instruction Register (cable 102) to Compare Register #1. The output of OR circuit 306 (wire 266) is also used to gate the Level Register (cable 130 to Compare Register #2.

The LLL-3 pulse extends to FIG. 2D where it is applied to gate 206 in order to test the Compare Unit. If Compare Register #1 is less than or equal to Compare Register #2, a pulse will appear on wire 132. If this is not the case, a pulse will appear on wire 134. Wire 132 extends to FIG. 2E where it is applied to OR circuit 208. The output of OR circuit 208 is wire 136 which extends to FIG. 2A where a pulse on it will indicate a security violation #1. Wire 134 extends to FIG. 2F where a pulse on it will start the pulse generator 210 to produce the LLL-4, the LLL-5, and the LLL-6 pulses.

The LLL-4 pulse, on FIG. 2F, extends through OR circuit 308 to wire 256. Wire 256 extends to FIG. 3A where a pulse on it will gate the Level Register via cable 130 to the left-hand side of the Link Stack. The LLL-4 pulse is also used on FIG. 3A to gate the Instruction Counter (cable 112) to the right-hand side of the Link Stack.

The LLL-5 pulse, on FIG. 2F, extends through OR circuit 310 to wire 268. Wire 268 extends to FIG. 3B where a pulse on it will gate the B field of the Instruction Register (cable 102) to the Level Register. The LLL-5 pulse also extends through OR circuit 312 to wire 270. Wire 270 extends to FIG. 2A where a pulse on it will gate the A field of the Instruction Register (cable 100) to the Instruction Counter via gate 271.

The LLL-6 pulse, on FIG. 2E, extends through OR circuit 202 to wire 128. Wire 128 extends to FIG. 2A where a pulse on it will request an Instruction Fetch.

The LLL-7 pulse, on FIG. 2F, extends through OR circuit 310 to wire 268. Wire 268 extends to FIG. 3B where a pulse on it is used to gate the B field of the Instruction Register (cable 102) to the Level Register.

The LLL-8 pulse, on FIG. 2F, extends through OR circuit 308 to wire 256. Wire 256 extends to FIG. 3A where a pulse on it gates the Level Register (cable 130) to the left-hand side of the Link Stack.

The LLL-9 pulse, on FIG. 2F, extends through OR circuit 312 to wire 270. Wire 270 extends to FIG. 2A where a pulse on it will gate the A field of the Instruction Register (cable 100) to the Instruction Counter.

The LLL-9 pulse also extends to the upper left-hand corner of FIG. 2A where it causes the Instruction Unit to be set to problem (non supervisor) state.

The LLL-10 pulse, on FIG. 2E extends through OR circuit 202 to wire 128. Wire 128 extends to FIG. 2A where a pulse on it will request an Instruction Fetch.

Link Return

The next instruction to be described is called "Link Return." This sequence is initiated by a link return instruction being interpreted by the decoder which produces a pulse on wire 160 which starts from gate 174 on FIG. 2C. Wire 160 extends to FIG. 2F where a pulse on it is used to start the pulse generator 214 which produces the LR-1 and LR-2 pulse sequence.

The LR-1 pulse, on FIG. 2F, extends through OR circuit 306 to wire 266. Wire 266 extends to FIG. 3C where a pulse on it sets the Link Stack Flip-Flop to its "1" state. Wire 266 also extends to FIG. 2D where a pulse on it is used to gate the Level Register (cable 130) to Compare Register #2 via gate 267. The LR-1 pulse also extends to FIG. 2D where a pulse on it is used to gate the left-hand Link Stack (cable 114) to Compare Register #1 via gate 115.

The LR-2 pulse extends to FIG. 2D where it is applied to gate 316 in order to test the Compare Unit. If Compare Register #1 is equal to Compare Register #2, a pulse will appear on wire 278. Wire 278 extends to FIG. 2A where a pulse on it indicates a security violation #2. If Register #1 is greater than Register #2, a pulse will appear on wire 402. Wire 402 also extends to FIG. 2A where a pulse on it indicates a security violation #3. If Register #1 is less than Register #2, a pulse will appear on wire 280. Wire 280 extends to FIG. 2F where a pulse on it will start the pulse generator 314 which produces the pulse sequence LR-3 through LR-6.

The LR-3 pulse extends to FIG. 2C where it is used to gate the left-hand Link Stack cable 114 to the Hold Register via gate 121. The LR-3 pulse also extends to FIG. 2A where it is used to gate the right-hand Link Stack (cable 116) to the Instruction Counter via gate 117.

The LR-4 pulse extends to FIG. 3B where it is used to gate the Hold Register (cable 104) to the Level Register via gate 107.

The LR-5 pulse on FIG. 2E extends through OR circuit 200 to wire 126. Wire 126 extends to FIG. 2A where a pulse on it extends through OR circuit 198 to increment the Instruction Counter.

The LR-6 pulse on FIG. 2E extends through OR circuit 202 to wire 128. Wire 128 extends to FIG. 2A where a pulse on it will request an instruction fetch by the Instruction Unit.

Insert Protection

The next instruction sequence to be described is called "insert protection". This is abbreviated "IP". It will first be necessary to explain the "insert protection logic" which is shown on FIG. 5 in detail. The protection bits to be inserted are in the B field of the Instruction Register and these bits extend via cable 102 to FIG. 5 where they are applied to gates 216 through 228 inclusive (even numbers only). The outputs of these just-mentioned gates extend via cable 172 to the Protection Register on FIG. 3B under control of the IP-1 pulse. The wires at the top of FIG. 5 come from the input wires to the "protection logic" box on FIG. 2C and it will be noted that these wires are numbered 0 through 6 inclusive and these numbers represent the decoded value of the Level Register and the value "0" if the machine is in supervisor state. The Level Register is shown on FIG. 3B.

Figure 5:
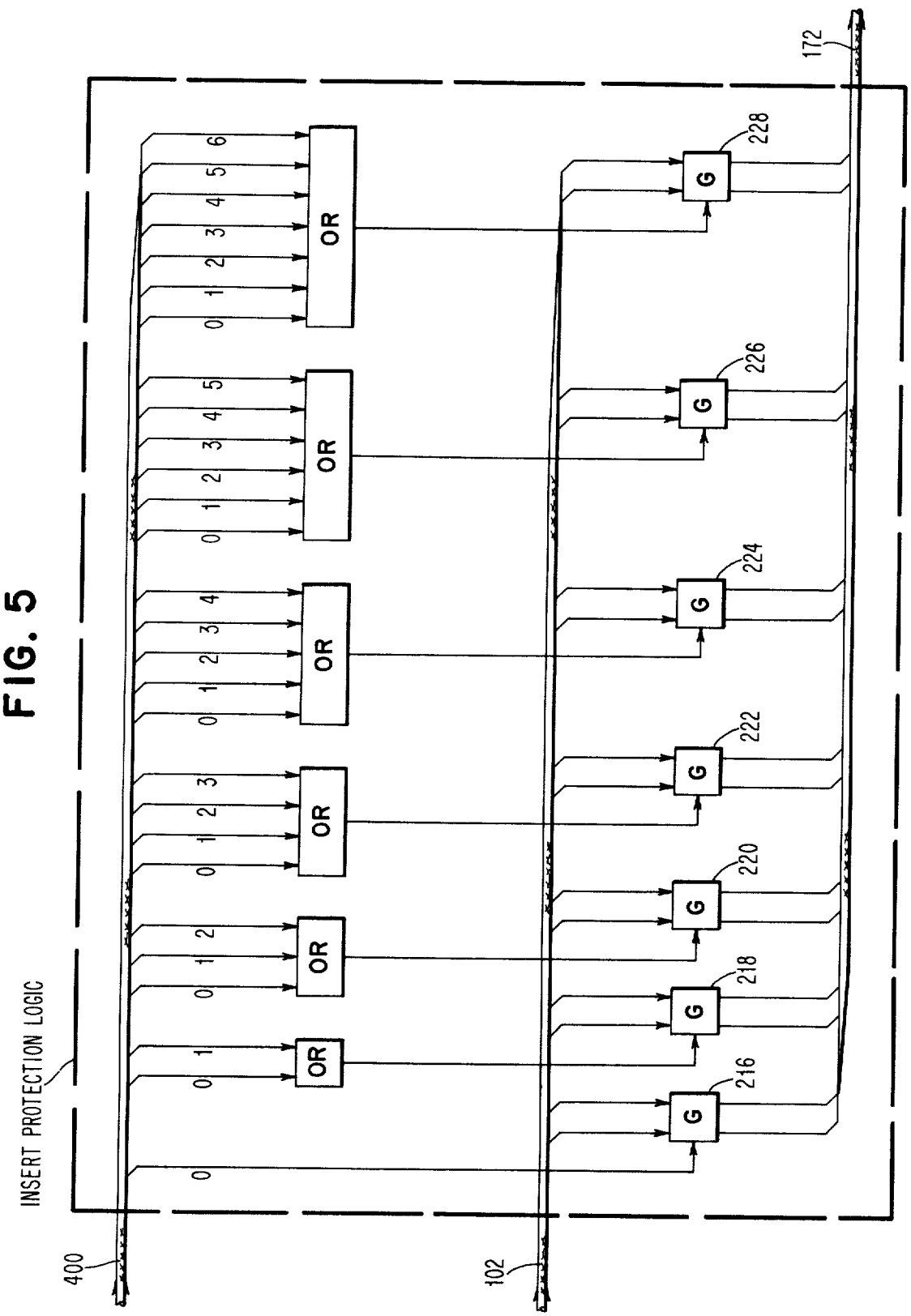
FIG. 5 is a logical schematic drawing of the Insert Protection Logic which is shown at the bottom of FIG. 2D.

The way in which these wires function on FIG. 5 is as follows. If the "0" wire is active, then all gates 216 through 228 (even numbers only) will be enabled and all seven bits will be transferred from cable 102 to cable 172. If the number "1" wire is active, then only gates 218 through 228 (even numbers only) will be enabled and only the right-hand six bits will be transferred from cable 102 to cable 172. If the number "2" wire is active, then gates 220 through 228 (even numbers only) will be enabled and only the five right-most bits will be transferred from cable 102 to cable 172. If the "3" wire is active, then gates 222 through 228 (even numbers only) will be enabled and only the four right-hand bits will be transferred from cable 102 to cable 172. If the "4" wire is active, then gates 224 through 228 will be enabled and only the three right-hand bits will be transferred from cable 102 to cable 172. If the "5" wire is active, then gates 226 and 228 will be enabled and only the two right-hand bits will be transferred from cable 102 to cable 172. If the "6" wire is active, then only gate 228 will be enabled and only the right-hand bit will be transferred from cable 102 to cable 172.

Proceeding now with the description of the "insert protection" sequence, it is started by a pulse on wire 162 which comes from gate 174 on FIG. 2C. The pulse of course originates on the appropriate output line from Decoder 176. Wire 162 extends to FIG. 2F where a pulse on it is used to start the pulse generator 230 in order to produce the three-pulse sequence IP-1, IP-2 and IP-3. On FIG. 3B, the IP-1 pulse is used to gate cable 172 to the Protection Register. As explained previously, cable 172 comes from the "insert protection logic." On FIG. 2E the IP-2 pulse extends through OR circuit 200 to wire 126. Wire 126 extends to FIG. 2A where a pulse on it will pass through OR circuit 198 to increment the Instruction Counter.

On FIG. 2E the IP-3 pulse extends through OR circuit 202 to wire 128. Wire 128 extends to FIG. 2A where a pulse on it is used to request an instruction fetch.

Store Level

The next instruction sequence to be described is the "store level." This is abbreviated "SL." It is initiated by the occurrence of the instruction OP code in the Instruction Register which is decoded by Decoder 176 which raises the appropriate output line.

This sequence is started by a pulse on wire 164 which emanates from gate 174 on FIG. 2C. Wire 164 extends to FIG. 2E where a pulse on it is used to start the pulse generator 232 which produces the pulse sequence SL-1 through SL-3 inclusive.

On FIG. 2F the SL-1 pulse extends through OR circuit 234 to wire 142. Wire 142 extends to FIG. 2B where a pulse on it is used to gate cable 100 to the Memory Address Register via gate 143. Cable 100 comes from the A field of the Instruction Register.

The SL-2 pulse extends through OR circuit 300 on FIG. 2F to wire 262. Wire 262 extends to FIG. 2B where a pulse on it will pass through OR circuit 184 to give a READ command to the memory.

The SL-3 pulse is applied to gate 412 on FIG. 2F in order to test the state of wire 106. If wire 106 is active, a pulse will appear on wire 404 to start the pulse generator 416 on FIG. 2E which produces the pulse sequence SL-4 through SL-7. If wire 106 is not active, a pulse will appear on wire 406 which pulse will extend through OR circuit 208 on FIG. 2E to wire 136. Wire 136 extends to FIG. 2A where a pulse on it will indicate a security violation #1.

The SL-4 pulse extends to FIG. 2B where it is used to gate the Level Register (cable 130) to the D field of the MDR via gate 131.

The SL-5 pulse extends through OR circuit 196 to wire 120. Wire 120 extends to FIG. 2B where a pulse on it will extend through OR circuit 188 to give a "store" command to the memory.

On FIG. 2E the SL-6 pulse extends through OR circuit 200 to wire 126. Wire 126 extends to FIG. 2A where a pulse on it extends through OR circuit 198 to increment the Instruction Counter.

On FIG. 2E, the SL-7 pulse extends through OR circuit 202 to wire 128. Wire 128 extends to FIG. 2A where a pulse on it will request an instruction fetch in the instruction unit.

Store Protection Register

The next instruction sequence to be described is called "store protection register" which is abbreviated "SPR".

This sequence is initiated by a pulse on wire 166 which starts at gate 174 on FIG. 2C (evolves from Decoder 176). Wire 166 extends to FIG. 2F where a pulse on it will start the pulse generator 401 which delivers the pulse sequence SPR-1 through SPR-3 inclusive.

On FIG. 2F the SPR-1 pulse extends through OR circuit 234 to wire 142. Wire 142 extends to FIG. 2B where a pulse on it will gate cable 100 to the Memory Address Register via gate 143. Cable 100 comes from the A field of the Instruction Register.

The SPR-2 pulse extends through OR circuit 300 on FIG. 2F to wire 262. Wire 262 extends to FIG. 2B where a pulse on it will pass through OR circuit 184 to give a READ command to the memory.

The SPR-3 pulse (FIG. 2F) is applied to gate 414 in order to test the state of wire 106. If wire 106 is active, a pulse will appear on wire 408 to start the pulse generator 418 which produces the pulses SPR-4 through SPR-7. If wire 106 is not active a pulse will appear on wire 410 which pulse will extend through OR circuit 208 on FIG. 2E to wire 136. Wire 136 extends to FIG. 2A where a pulse on it will indicate a security violation #1.

The SPR-4 pulse extends to FIG. 2B where it is used to gate the Protection Register on FIG. 3B via cable 108 to the E field of the MDR via gate 186.

On FIG. 2E, the SPR-5 pulse extends through OR circuit 196 to wire 120. Wire 120 extends to FIG. 2B where a pulse on it will pass through OR circuit 188 to give a "store" command to the Memory.

On FIG. 2E the SPR-6 pulse extends through OR circuit 200 to wire 126. Wire 126 extends to FIG. 2A where a pulse on it will pass through OR circuit 198 to increment the Instruction Counter.

On FIG. 2E the SPR-7 pulse extends through OR circuit 202 to wire 128. Wire 128 extends to FIG. 2A where a pulse on it will request an instruction fetch.

Load into Link Stack

The next instruction to be described is the "load into Link Stack" instruction, which is abbreviated "LLS." This sequence is started by a pulse on wire 168 which starts at gate 174 on FIG. 2C (sequence initiated by Decoder 176). Wire 168 extends to FIG. 2E where a pulse on it will start the single shot 318 to produce the LLS-1 pulse. The LLS-1 pulse extends to FIG. 2A where it is applied to gate 338 in order to test the condition of wire 118. If wire 118 is active, a pulse will appear on wire 250. If wire 118 is not active, a pulse will appear on wire 248.

Wire 248 extends to FIG. 2E where it is applied to OR circuit 208, the output of which is wire 136. Wire 136 extends to FIG. 2A where a pulse on it indicates a Security Violation #1. Wire 250 extends to FIG. 2E where a pulse on it will start the single shot 320 to produce the LLS-2 pulse.

The LLS-2, on FIG. 2F, extends through OR circuit 342 to wire 272. Wire 272 extends to FIG. 2D where a pulse on it will Reset the Word Counter to 00–00 (all zeros). The LLS-2 pulse also, on FIG. 2F, extends through OR circuit 296 to wire 258. Wire 258 extends to FIG. 2C where a pulse on it will gate the A field of the Instruction Register via cable 100 and gate 259 to Hold Register. The LLS-2 pulse also, on FIG. 2F, extends through OR circuit 342 to wire 272. Wire 272 extends to FIG. 3C where a pulse on it will reset the Link Stack Flip-Flop to its "0" state.

After the single shot 320 has produced the LLS-2 pulse on turning off, it will emit a pulse which passes through OR circuit 322 on FIG. 2E to start pulse generator 324 which produces the pulse LLS-3 through LLS-7.

On FIG. 2F, the LLS-3 pulse extends through OR circuit 298 to wire 260. Wire 260 extends to FIG. 2B where a pulse on it is used to gate the Hold Register (cable 104) to the MAR via gate 105.

On FIG. 2F, the LLS-4 pulse extends through OR circuit 300 to wire 262. Wire 262 extends to FIG. 2B where a pulse on it extends through OR circuit 184 to give a "Read" command to the Memory.

The LLS-5 pulse extends to FIG. 3A where it is used to gate the C field of the MDR via cable 284 to the left side of the Link Stack via gate 285 and also to gate the C, D and E fields of the MDR (cable 286) to the right side of the Link Stack via cable 112.

On FIG. 2F, the LLS-6 pulse extends through OR circuit 344 to wire 274. Wire 274 extends to FIG. 2D where a pulse on it is used to increment the Word Counter. Also, on FIG. 2F, the LLS-6 pulse extends through OR circuit 302 to wire 264. Wire 264 extends to FIG. 2C where a pulse on it is used to increment the Hold Register.

The LLS-7 pulse extends to FIG. 2D where it is used to test the Word Counter via gate 191. If the Word Counter is on 00–01000, a pulse will appear on wire 290. If this is not the case, a pulse will appear on wire 288. Wire 288 extends to FIG. 2E where a pulse on it will extend through OR circuit 322 to again start pulse generator CPG 324. Wire 290 also extends to FIG. 2E and a pulse on it will start the pulse generator CPG 326 which produces the LLS-8 and LLS-9 pulse sequence.

On FIG. 2E, the LLS-8 pulse extends through OR circuit 200 to wire 126. Wire 126 extends to FIG. 2A where a pulse on it will pass through OR circuit 198 to increment the Instruction Counter.

On FIG. 2E, the LLS-9 pulse extends through OR circuit 202 to wire 128. Wire 128 extends to FIG. 2A where a pulse on it will request an "instruction fetch" from the Instruction Unit.

Store from Link Stack

The next instruction to be described is called "Store from Link Stack," which is abbreviated "SLS". This sequence is started by a pulse on wire 276 (originating from Decoder 176) which emanates from gate 174 on FIG. 2C. Wire 276 extends to FIG. 2E and a pulse on it will start the single shot 328 to produce the SLS-1 pulse.

The SLS-1 pulse extends to the lower right-hand corner of FIG. 2A where it is applied to gate 340 in order to test wire 118. If wire 118 is active, a pulse will appear on wire 254. If wire 118 is not active, a pulse will appear on wire 252. Wire 252 extends to FIG. 2E where a pulse on it would extend through OR circuit 208 to wire 136. Wire 136 extends to FIG. 2A where a pulse on it will indicate a security violation #1. Wire 254 extends to FIG. 2F where a pulse on it will start the single shot 330 to produce the SLS-2 pulse.

On FIG. 2F, the SLS-2 pulse extends through OR circuit 342 to wire 272. Wire 272 extends to FIG. 2D where a pulse on it is used to reset the Word Counter to 00–00. Wire 272 also extends to FIG. 3C where a pulse on it is used to reset the Link Stack Flip-Flop to its "0" state. The SLS-2 pulse, on FIG. 2F, extends through OR circuit 296 to wire 258. Wire 258 extends to FIG. 2C where a pulse on it will gate the A field of the Instruction Register via cable 100 and gate 259 to the Hold Register.

On FIG. 2F, when single shot 330 turns off, a pulse is produced which extends through OR circuit 332 to start the pulse generator CPG 334 which produces the pulses SLS-3 through SLS-6.

The SLS-3 pulse, on FIG. 2F extends through OR circuit 298 to wire 260. Wire 260 extends to FIG. 2B where a pulse on it will gate the Hold Register via cable 104 and gate 105 to the MAR. The SLS-3 pulse extends to FIG. 2B where it gates the left side of the Link Stack via cable 114 and gate 119 to the C field of the MDR and the right side of the Link Stack via cable 116 and gate 113 to the C, D and E fields of the MDR.

On FIG. 2E, the SLS-4 pulse extends through OR circuit 196 to wire 120. Wire 120 extends to FIG. 2B where a pulse on it extends through OR circuit 188 to give a "Store" command to the memory.

The SLS-5 pulse, on FIG. 2F, extends through OR circuit 344 to wire 274. Wire 274 extends to FIG. 2D where a pulse on it is used to increment the Word Counter. Also, on FIG. 2F, the SLS-5 pulse extends through OR circuit 302 to wire 264. Wire 264 extends to FIG. 2C where a pulse on it will increment the Hold Register.

The SLS-6 pulse extends to FIG. 2D where it is used to test the Word Counter via gate 193. If the Word Counter is on 00–01000, a pulse will appear on wire 294. If this is not the case, a pulse will appear on wire 292. Wire 292 extends to FIG. 2F where a pulse on it will pass through OR circuit 332 and start the pulse generator 334. Wire 294 also extends to FIG. 2F where a pulse on it will start the pulse generator 336 to produce the SLS-7 and SLS-8 pulse sequence.

On FIG. 2E, the SLS-7 pulse extends through OR circuit 200 to wire 126. Wire 126 extends to FIG. 2A where a pulse on it will pass through OR circuit 198 to increment the Instruction Counter.

On FIG. 2E the SLS-8 pulse extends through OR circuit 202 to wire 128. Wire 128 extends to FIG. 2A where a pulse on it will request an "instruction fetch."

Check Data Fetch

The next operation to be described is that of checking the protection field in the MDR whenever a data fetch occurs. On FIG. 2B, when the Instruction Unit has caused a data fetch, the data will be in the MDR. Then, the Instruction Unit on FIG. 2A will emit a pulse on wire 148. Wire 148 extends to FIG. 2F where a pulse on it is applied to gate 242 in order to test the state of wire 106. If wire 106 is active, a pulse will appear on wire 150. If wire 106 is not active, a pulse will appear on wire 152. Wire 150 extends to FIG. 2A where a pulse on it indicates to the Instruction Unit that the data fetch is O. K. A pulse on wire 152 will extend on FIG. 2E, through OR circuit 208 to wire 136. Wire 136 extends to FIG. 2A where a pulse on it will indicate a security violation #1.

Check Data Store

The last operation to be described is that of checking the protection field in the MDR when a data store occurs. On a data store operation, the Instruction Unit must first fetch the memory word in order to get the protection field in the MDR. When this has happened, the Instruction Unit will emit a pulse on wire 246. Wire 246 extends to FIG. 2F where a pulse on it is applied to gate 346 in order to test the condition of wire 106. (Wire 106 is active if the protection circuitry (FIG. 4) has determined whether the leading bits of the protection register and the protection field of the memory word match. The number of bits compared is given by the contents of the level register.) If wire 106 is active, a pulse will appear on wire 256. If wire 106 is not active, a pulse will appear on wire 258. Wire 256 extends to FIG. 2A where a pulse on it will indicate to the Instruction Unit that it is O. K. to make the data store. On FIG. 2E, a pulse on wire 258 will extend through OR circuit 208 to wire 136. Wire 136 extends to FIG. 2A where a pulse on it will indicate a security violation #1.

In the above two sequences of operations for checking the security validity of data fetch and data store operations it should be understood that the right-hand level "0" Link Stack Register appearing in the upper portion of FIG. 3B will contain a level designation to which the running program must have the previously described relationship (equal) for the program to run and also the actual protection field (specified bits) for the program which must match the target protection field on both, read and write operations. The binary values stored in these two registers are transmitted via cables 130 and 108 into the Protection Logic block shown in detail on FIG. 4 wherein this value on cable 130 enters the decoder shown in the lower left-hand portion of FIG. 2C and whose output enters the left-hand side of the Protection Logic block, and the value on cable 108 enters the Protection Logic Block directly. The protection field from the MDR is transmitted into the Protection Logic block via cable 170 and there the bits of the protection field which are specified by the program's assigned level, as stored in the level register on FIG. 3B, are checked against the validity protection field stored in the Protection Register of FIG. 3B. These tests are applied to every data-fetch or store operation performed, including the new operations herein specified.

OPERATION SEQUENCE CHARTS
Store Protection in Memory (SPM)

SPM-1   Gate A field of Instruction Register to Hold Register
Gate B field of Instruction Register to Word Counter
→ SPM-2

SPM-2   Gate Hold Register to MAR
→ SPM-3

SPM-3   "Read" command to memory
→ SPM-4

SPM-4   Gate Protection Register to Protection Field of MDR
if protection logic agrees or if inclusive in supervisor state
→ SPM-5

SPM-5   "Store" command to memory
Is Word Counter = 00—00?
No → SPM-6
Yes → SPM-7

SPM-6   Increment hold register
Decrement word counter
→ SPM-2

SPM-7   Increment Instruction Counter
→ SPM-8

SPM-8   Request instruction fetch
DONE

Link to Lower Level (LLL)

LLL-1   Is line 118 active?
no → LLL-2 (not in supervisor state)
yes → LLL-7 (in supervisor state)

LLL-2   Set Link Stack F. F. to "1"
Gate B field of Instruction Register to Compare Register #1
Gate Level Register to Compare Register #2
→ LLL-3

LLL-3   Is Compare Register #1 ≦ Compare Return #2?
yes → Indicate security violation #1
no → LLL-4

LLL-4   Gate Level Register to left-side of Link Stack
Gate Instruction Counter to right-side of Link Stack
→ LLL-5

LLL-5   Gate B field of Instruction Register to Level Register
Gate A field of Instruction Register to Instruction Counter
→ LLL-6

LLL-6   Request Instruction Fetch
DONE

LLL-7   Gate B field of Instruction Register to Level Register
→ LLL-8

LLL-8   Gate Level Register to Link Stack
→ LLL-9

LLL-9   Gate A field of Instruction Register to Instruction Counter
Set CPU to Problem State
→ LLL-10

LLL-10   Request Instruction Fetch
DONE

Link Return (LR)

LR-1   Set Link Stack F. F. to "1"

-continued

|  | Gate Level Register to Compare Register #2 |
|---|---|
|  | Gate left-side of Link Stack to Compare Register #1 |
|  | → LR-2 |
| LR-2 | Test Compare Unit |
|  | Register #1 < Register #2 → LR-3 |
|  | Register #1 = Register #2 → Indicate Security Violation #2 |
|  | Register #1 > Register #2 → Indicate Security Violation #3 |
| LR-3 | Gate left side of Link Stack to Hold Register |
|  | Gate right side of Link Stack to Instruction Counter |
|  | → LR-4 |
| LR-4 | Gate Hold Register to Level Register |
|  | → LR-5 |
| LR-5 | Increment Instruction Counter |
|  | → LR-6 |
| LR-6 | Request Instruction Fetch |
|  | DONE |

Insert Protection (IP)

| IP-1 | Gate output of "Insert Protection Logic" to Protection Register. |
|---|---|
|  | → IP-2 |
| IP-2 | Increment Instruction Counter |
|  | → IP-3 |
| IP-3 | Request Instruction Fetch |
|  | DONE |

Store Level (SL)

| SL-1 | Gate A field of Instruction Register to MAR |
|---|---|
|  | → SL-2 |
| SL-2 | "Read" command to Memory |
|  | → SL-3 |
| SL-3 | Test Protection (wire 106) |
|  | wire 106 active → SL-4 |
|  | wire 106 not active → Indicate security violation #1 |
| SL-4 | Gate Level Register to D field of MDR |
|  | → SL-5 |
| SL-5 | "Store" command to Memory |
|  | → SL-6 |
| SL-6 | Increment Instruction Counter |
|  | → SL-7 |
| SL-7 | Request Instruction Fetch |
|  | DONE |

Store Protection Register (SPR)

| SPR-1 | Gate A field of Instruction Register to MAR |
|---|---|
|  | → SPR-2 |
| SPR-2 | "Read" command to Memory |
|  | → SPR-3 |
| SPR-3 | Test Protection (wire 106) |
|  | wire 106 active → SPR-4 |
|  | wire 106 not active → Indicate security violation #1 |
| SPR-4 | Gate Protection Register to E field of MDR |
|  | → SPR-5 |
| SPR-5 | "Store" command to Memory |
|  | → SPR-6 |
| SPR-6 | Increment Instruction Counter |
|  | → SPR-7 |
| SPR-7 | Request Instruction Fetch |
|  | DONE |

Load into Link Stack (LLS)

| LLS-1 | Is line 118 active? |
|---|---|
|  | no → Indicates security violation 1 |
|  | yes → LLS-2 |
| LLS-2 | Reset Word Counter to 00—00 |
|  | Gate A field of Instruction Register to Hold Register |
|  | Reset Link Stack F.F. to "0" |
|  | → LLS-3 |
| LLS-3 | Gate Hold Register to MAR |
|  | → LLS-4 |
| LLS-4 | "Read" command to Memory |
|  | → LLS-5 |
| LLS-5 | Gate C field of MDR to left side of Link Stack |
|  | Gate C, D and E fields of MDR to right side of Link Stack |
|  | → LLS-6 |
| LLS-6 | Increment Word Counter |
|  | Increment Hold Register |
|  | → LLS-7 |
| LLS-7 | Is Word Counter = 0-01000? |
|  | no → LLS-3 |
|  | yes → LLS-8 |
| LLS-8 | Increment Instruction Counter |
|  | → LLS-9 |
| LLS-9 | Request Instruction Fetch |
|  | DONE |

Store from Link Stack (SLS)

| SLS-1 | Is line 118 active? |
|---|---|
|  | no → Indicate Security Violation #1 |
|  | yes → SLS-2 |
| SLS-2 | Reset Word Counter to 00—00 |
|  | Reset Link Stack F.F. to "0" |
|  | Gate A field of Instruction Register to Hold Register |
|  | → SLS-3 |
| SLS-3 | Gate Hold Register to MAR |
|  | Gate left side of Link Stack to C field of MDR |
|  | Gate right side of Link Stack to C, D and E fields of MDR |
|  | → SLS-4 |
| SLS-4 | "Store" command to Memory |

-continued

| | |
|---|---|
| | → SLS-5 |
| SLS-5 | Increment Word Counter |
| | Increment Hold Register |
| | → SLS-6 |
| SLS-6 | Is Word Counter = 00-1000? |
| | no → SLS-3 |
| | yes → SLS-7 |
| SLS-7 | Increment Instruction Counter |
| | → SLS-8 |
| SLS-8 | Request instruction fetch |
| | DONE |
| | Check Data Fetch (CDF) |
| Pulse on wire 148 | Is line 106 active? |
| | yes → signal CPU to take data |
| | no → indicate security violation #1 |
| | Check Data Store (CDS) |
| Pulse on wire 246 | Is line 106 active? |
| | yes → O.K. to store |
| | no → indicate security violation #1 |

CONCLUSIONS

It may be seen from the above detailed description of the hierarchical security mechanism that an extremely versatile and flexible security mechanism is possible by providing a very small amount of additional storage space in each system word, i.e., data word instruction, which is utilized for the hierarchical information. In the embodiment described herein, no additional space was required by using a wider word which requires less ECC bits. The disclosed hardware is designed to utilize this hierarchical security information in a most efficient manner to effect the security regulation imposed upon the system, namely that a given running program only has access to those segments of memory permitted by its own security level taken together with its assigned protection field. Further, a given program can invoke a sub-application to run at a lower security level, but can never do so at a higher security level. Additionally, a given running program can return to a higher security level calling program only through certain very precisely defined channels whereby the "linking from" address is saved in a set of special purpose registers so that it is not possible for a program to subvert the security mechanism by virtue of a spurious or incorrect link back address.

While the presently disclosed hardware mechanism is considered to be an optimum embodiment it should readily be understood that many variations in forms and details of such complex hardware mechanisms are readily obtained by those skilled in the art. Larger protection and/or level fields could readily be used and certain of the special instructions could either be further broken down into more detailed instructions or even combined where a system designer might feel time or hardware could be saved.

Thus while the invention has been specifically disclosed and described with respect to the disclosed embodiment it will be readily appreciated by those skilled in the art that the above mentioned alterations and changes could be made without departing from the spirit and scope of the invention as disclosed.

What is claimed is:

1. An electronic computing system having a hierarchical security mechanism incorporated therein, said system including a memory for storing both instructions and data, an instruction execution unit for extracting series of instructions from the memory and executing same, and a processing unit for performing the data operations required by said instructions, said hierarchical security mechanism being dynamically actuable by application programs and including means actuable by an application programmer for assigning a hierarchical protection level for each program instruction sequence included in an overall running program, wherein successive hierarchical protection levels have successively reduced privelege to access storage locations in said memory, means for assigning a unique protection field to each such instruction sequence, means for storing the particular protection field assigned to each instruction sequence in every storage location in said memory to which it is intended that access by said instruction sequence is to be permitted, and means actuable during the running of a program for ascertaining that the protection field of each memory access matches the protection field of the instruction sequence which initiated said access, which comprises means for comparing the protection field of a requesting instruction with the stored protection field of the accessed location in memory and predicating access on a successful comparison, said comparison being a function of the hierarchical protection level of the requesting instruction.

2. A hierarchical security mechanism as set forth in claim 1, including means for detecting the magnitude of the hierarchical protection level assigned to each instruction sequence and means for examining a portion of the protection field whose size is directly dependent on such hierarchical protection level magnitude and means for causing a security violation indication if the required degree of protection field matching does not occur.

3. A hierarchical security mechanism as set forth in claim 2, including means for requiring that any application instruction sequence subjected by it to security validation requirements, cannot under any circumstances invoke any sub-application instruction sequence not subject to precisely the same security validation requirements as the calling sequence, but can nevertheless impose upon such sub-application instruction sequence additional security validation requirements.

4. A hierarchical security mechanism as set forth in claim 2, including means for specifying that a given instruction sequence is to branch to another instruction sequence or sub-application including means for automatically assigning a lower hierarchical protection level to the sub-application than the originating instruction sequence, and means for assuring that the protection field for the sub-application matches that of the calling instruction sequence and further requires that any memory access must match an additional portion of the protection field as specified by the hierarchical protection level indicator for that sub-application.

5. A hierarchical security mechanism as set forth in claim 4, including means for allowing a plurality of sub-application instruction sequences to be called within a single instruction stream including means for always assigning a lower hierarchical protection level to each sub-application than the calling instruction sequence and means for providing that, at termination of the sub-application instruction sequence, the system returns to the specific location in the original instruction stream where the sub-application sequence began.

6. A hierarchical security mechanism as set forth in claim 5, including means operable when a sub-application sequence request is detected to automatically store the hierarchical protection level for the calling instruction sequence and also store the precise location in memory where the next instruction of the original calling instruction sequence may be obtained upon termination of the called sub-application instruction sequence.

7. A hierarchical security mechanism as set forth in claim 6, including means operable when a sub-application sequence request is detected to automatically store the protection field for the calling instruction sequence whereby said protection field of the original calling instruction sequence may be obtained upon termination of the called sub-application instruction sequence.

8. A hierarchical security mechanism as set forth in claim 7, wherein said means for storing the protection field for the calling instruction sequence comprises a plurality of linking registers forming a link stack wherein each register contains a storage location for 1) a hierarchical protection level indicator, 2) a branch-back address and 3) a protection field and means for assigning such a register to each predetermined security level within said hierarchical security mechanism, and further including means to return to the branch-back address contained in one register of said link stack pointed to by another register in said link stack when a given sub-application instruction sequence is completed.

9. A hierachical security mechanism as set forth in claim 8, including a separate linking register in said link stack for each of the permitted levels of the security hierarchy and means for determining the hierarchical protection level field for any particular instruction sequence to automatically indicate the member of the link stack into which specific linking information is to be stored when it is required to link to that sub-application instruction sequence.

10. A hierarchical security mechanism as set forth in claim 9, including means operable when said computing system is operating in a multiprogramming mode to store the entire contents of the link stack at a predetermined location in memory whenever the time slot for a particular program running on the system terminates, or the said program is for any other reason interrupted, and means for recovering said entire link stack information from memory and restoring same to the linking registers whenever a time slot for said particular program is again allocated.

11. A hierarchical security mechanism as set forth in claim 9, including means for reserving the highest protection level to the operating system of the computing system, and means for utilizing the linking register location for said highest protection level as the working storage register for the hierarchical protection level indicator and the protection field against which all memory fetches must be checked.

12. A hierarchical security mechanism as set forth in claim 11, including means for preventing a sub-application program for returning to a hierarchical protection level of equal or less privilege than the level of the sub-application program from whence said return is being effected.

13. A hierarchical security mechanism as set forth in claim 12, including means for detecting that at least two sub-application programs are being specified by a given calling program at the same hierarchical level and means for assigning protection fields to each of said sub-application programs of said same hierarchical protection level whereby the memory space of each sub-application program will be protected from the other.

14. In an electronic computing system wherein said system includes a main memory for storing both instruction and data, an instruction execution unit for accessing and executing instructions from said main memory, an arithmetic and logic unit, and input/output devices selectively connectable to said system, wherein said system utilizes a data word format having a width including at least $n$ bits which may be selectively utilized for security control purposes, the improvement which may be selectively utilized for security control purposes, the improvement which comprises a hierarchical security mechanism for controlling all memory accesses in said system, said mechanism including means for accessing an assigned predetermined hierarchical protection level and protection field for an instruction sequence currently running on the system wherein successive hierarchical protection levels have successively reduced privelege to access storage locations in said memory, means for accessing the protection level and protection field assigned to a called instruction sequence, means for checking the protection level and protection field of said called instruction sequence to determine if 1) the called protection level is less than the calling protection level and 2) a specified portion of the two protection fields match before the called instruction sequence can proceed and means for producing a security violation if either the protection level or protection field do not match.

15. A hierarchical security mechanism as set forth in claim 14, including means for selectively assigning as many hierarchical security levels to instruction sequences to be run on said system as there are security control bits in the said protection field.

16. A hierarchical security mechanism as set forth in claim 15, including a hierarchical security mechanism link stack wherein said stack includes a plurality of linking registers wherein each linking register is dedicated to a particular hierarchical protection level and means for storing in each such register in a specified field, thereof, the level from which a particular running instruction sequence branched, the previously designated protection field for the calling instruction sequence, and the address in memory at which the next instruction in said calling instruction sequence is located.

17. A hierarchical security mechanism as set forth in claim 16, wherein the linking register for the highest protection level within said system is dedicated for use as a storage mechanism for the protection level and protection field of the instruction sequence currently running in the system, and means for comparing the contents of this register against the protection field of any memory access made to the main memory.

18. A hierarchical security mechanism as set forth in claim 17, including means for inserting a specified binary protection field in said highest level register of said link stack whenever a new instruction sequence begins to run on the system, said protection field being that of said new instruction sequence.

19. A hierarchical security mechanism as set forth in claim 18, including means operable to access a predetermined number of words in said main memory at an address specified by the operating system and inserting the protection field currently stored in said highest level register of said link stack in the security control bit field of such specific word in said memory.

20. A hierarchical security mechanism as set forth in claim 19, including means for allowing a programmer to request a particular security level and protection field from the operating system and for causing the operating system to assign said requested protection level and protection field to a particular instruction sequence and means for storing said protection level in the level and protection fields of said highest level register in said link stack and means for storing said protection level and protection field information in memory at an address specified by the operating system to become a necessary part of the instruction sequence for a particular program.

21. A hierarchical security mechanism as set forth in claim 20, including means for initiating a sub-application instruction sequence request by a calling instruction sequence including means for accessing the protection level of the sub-application instruction sequence, means for comparing said protection level with the level of the calling instruction sequence, means for producing a security violation if the protection level of the sub-application instruction sequence is equal to or greater than the protection level of the calling instruction sequence, means for continuing with the branch instruction if the protection level of the sub-application sequence is less than the level of the calling instruction sequence, means for accessing the register of said link stack to which said sub-application protection level points, means for storing the protection level of the calling instruction sequence in the level field of said register, and means for storing the branch-back address and the protection field of the calling instruction sequence in said specified register of said link stack.

22. A hierarchical security mechanism as set forth in claim 21, including means actuable upon the termination of a sub-application instruction sequence to access the particular link stack register to which the level indicator for the currently running sub-application instruction sequence points, means for comparing the current protection level indication with the protection level indication in said pointed to link stack register and providing an interrupt if said called protection level is equal to or less than the protection level of the currently running sub-application instruction sequence, and means operable upon an indication that the level stored is larger than the current protection level to branch-back to the calling instruction sequence at the branch-back address stored in said link stack for storing the security level and protection field also stored in said pointed to link stack register in the level and protection fields of said highest level register of said link stack.

23. A hierarchical storage mechanism as set forth in claim 22, including means operable whenever a system interrupt occurs to load the entire contents of said link stack into main memory at a predetermined address and further means for recalling said entire link stack and reloading same into said linking registers when said particular instruction sequence which was interrupted is returned to by the system for execution.

* * * * *